US012691719B2

(12) United States Patent
Collins et al.

(10) Patent No.: US 12,691,719 B2
(45) Date of Patent: Jul. 28, 2026

(54) SUSPENSION SYSTEM FOR AN AUTOMOTIVE VEHICLE

(71) Applicant: DOMIN FLUID POWER LIMITED, Bristol (GB)

(72) Inventors: Andrew Collins, Bristol (GB); Tobias Sandin, Bristol (GB)

(73) Assignee: DOMIN FLUID POWER LIMITED, Bristol (GB)

( * ) Notice: Subject to any disclaimer, the term of this patent is extended or adjusted under 35 U.S.C. 154(b) by 0 days.

(21) Appl. No.: 18/558,116

(22) PCT Filed: May 5, 2022

(86) PCT No.: PCT/GB2022/051149
§ 371 (c)(1),
(2) Date: Oct. 30, 2023

(87) PCT Pub. No.: WO2022/234285
PCT Pub. Date: Nov. 10, 2022

(65) Prior Publication Data
US 2024/0217301 A1     Jul. 4, 2024

(30) Foreign Application Priority Data

May 6, 2021     (GB) ..................................... 2106495

(51) Int. Cl.
*B60G 17/08*          (2006.01)
*B60G 11/26*          (2006.01)
(Continued)

(52) U.S. Cl.
CPC ............ *B60G 17/08* (2013.01); *B60G 11/265* (2013.01); *B60G 17/056* (2013.01); *F16F 9/096* (2013.01);
(Continued)

(58) Field of Classification Search
CPC .............. B60G 11/265; B60G 17/0432; B60G 17/056; B60G 17/08; B60G 2202/154;
(Continued)

(56) References Cited

U.S. PATENT DOCUMENTS 7,766,343 B2      8/2010  Bauer
2004/0112659 A1   6/2004  Kramer et al.
(Continued)

FOREIGN PATENT DOCUMENTS

DE            10207983 A1     9/2003
DE          102008012704 A1   9/2009
(Continued)

OTHER PUBLICATIONS

GB Search Report corresponding to Application No. GB2106495.1, dated Oct. 19, 2021, 5 pages.
(Continued)

*Primary Examiner* — John M Zaleskas
(74) *Attorney, Agent, or Firm* — Day Pitney LLP; Anthony A. Kassas; Christopher J. Head

(57)          ABSTRACT

A suspension system for an automotive vehicle comprising a hydraulic actuator for mounting between a wheel assembly and a body of the automotive vehicle. The system also comprises a hydraulic system configured to provide a supply of fluid to the hydraulic actuator. The hydraulic system is configured during normal operation to provide fluid at a static pressure greater than 7 MPa (70 Bar) to the hydraulic actuator. In embodiments of the invention, the hydraulic system comprises a plurality of gas accumulators, wherein the system is configured to transmit changes in fluid pressure between the hydraulic actuator, common flow path and gas accumulators such that the hydraulic actuator has a first stiffness when the hydraulic system is in the first configu-
(Continued)

201 ration and a second, different, stiffness when the hydraulic system in the second configuration.

16 Claims, 15 Drawing Sheets

(51) Int. Cl.
　　*B60G 17/056*　　　　(2006.01)
　　*F16F 9/096*　　　　(2006.01)
(52) U.S. Cl.
　　CPC .. *B60G 2202/154* (2013.01); *B60G 2202/413* (2013.01); *B60G 2500/2064* (2013.01)
(58) Field of Classification Search
　　CPC ........ B60G 2202/413; B60G 2202/416; B60G 2500/2064; F16F 9/096
　　See application file for complete search history.

(56) References Cited

U.S. PATENT DOCUMENTS

| 2005/0275184 | A1* | 12/2005 | Lamela | B60G 17/0152 |
| | | | | 280/124.157 |
| 2009/0200127 | A1* | 8/2009 | Janes | F16F 9/44 |
| | | | | 188/314 |
| 2009/0230637 | A1* | 9/2009 | Bauer | B60G 17/015 |
| | | | | 267/64.25 |
| 2011/0187065 | A1* | 8/2011 | Van Der Knaap | B60G 17/016 |
| | | | | 280/5.507 |
| 2012/0046827 | A1* | 2/2012 | Larkins | B60G 17/018 |
| | | | | 701/37 |
| 2015/0001825 | A1* | 1/2015 | Kazimiers | B60G 21/073 |
| | | | | 280/124.112 |
| 2015/0202940 | A1* | 7/2015 | Germain | B60G 17/04 |
| | | | | 280/124.161 |
| 2018/0022179 | A1* | 1/2018 | Collins | B60G 17/0424 |
| | | | | 280/5.5 |
| 2018/0208011 | A1* | 7/2018 | Wigg | B60G 17/0152 |

| 2019/0084367 | A1* | 3/2019 | Birch | B60G 15/06 |
| 2019/0118882 | A1* | 4/2019 | Kinder | B62D 61/125 |
| 2020/0247209 | A1* | 8/2020 | Dietrich | B60G 17/0432 |
| 2021/0237528 | A1* | 8/2021 | Flory | B60G 3/20 |
| 2022/0161872 | A1* | 5/2022 | Streit | B62D 33/0608 |
| 2023/0226875 | A1* | 7/2023 | Cotto | B60G 21/073 |
| | | | | 280/124.161 |
| 2023/0278385 | A1* | 9/2023 | Zhao | F15B 13/024 |
| 2024/0109383 | A1* | 4/2024 | Flory | B60G 11/265 |
| 2025/0135822 | A1* | 5/2025 | Flory | B60G 17/056 |

FOREIGN PATENT DOCUMENTS

| DE | 102014011549 | A1 | | 4/2015 | |
| DE | 102017218905 | A1 | | 4/2019 | |
| EP | 1769951 | A1 | | 3/2010 | |
| EP | 3789219 | A1 | | 3/2021 | |
| GB | 2518901 | A1 | | 4/2015 | |
| GB | 2536980 | A1 | | 10/2016 | |
| GB | 2537062 | A | * | 10/2016 | F15B 15/149 |
| GB | 2566543 | A1 | | 3/2019 | |
| GB | 2569189 | A | * | 6/2019 | B60G 11/26 |
| GB | 2569189 | A1 | | 6/2019 | |
| JP | H0171243 | U | | 5/1989 | |
| JP | H03262720 | A2 | | 11/1991 | |
| JP | 2004276854 | A | | 10/2004 | |
| WO | 2019204675 | A1 | | 10/2019 | |
| WO | 2021209282 | A1 | | 10/2021 | |

OTHER PUBLICATIONS

International Search Report and Written Opinion corresponding to Application No. PCT/GB2022/051149, dated Aug. 1, 2022, 19 pages.
EP Examination Report corresponding to Application No. 22723733.6, dated Jul. 25, 2025, 9 pages.
EP Examination Report corresponding to Application No. 22723733.6, dated Feb. 23, 2026, 12 pages.
JP Office Action corresponding to Application No. 2023-568434, dated May 29, 2026, 9 pages.

* cited by examiner

SUSPENSION SYSTEM FOR AN AUTOMOTIVE VEHICLE

CROSS-REFERENCED APPLICATIONS

The present application is a U.S. National Stage Application of International Application No. PCT/GB2022/051149 filed May 5, 2022 and published on Nov. 10, 2022 as WO 2022/234285 A1, which claims the benefit and priority of Great Britain Patent Application No. 2106495.1 filed May 6, 2021, each of which is incorporated herein by reference in its entirety for any purpose whatsoever.

FIELD OF THE DISCLOSURE

The present disclosure concerns a suspension system for an automotive vehicle. More particularly, but not exclusively, this disclosure concerns suspension systems having a high-pressure hydraulic actuator, methods of operating such a suspension system and an automotive vehicle including such a suspension system.

BACKGROUND

The suspension system of an automotive vehicle allows for displacement of the wheels relative to the body of the vehicle and must balancing the competing requirements of passenger comfort and road handling to provide a vehicle that is both safe and pleasant to use.

Historically, each wheel has been provided with a spring and a damper thereby providing a suspension having fixed characteristics. More recently, suspension systems in which the damping and/or spring rate can be varied have been provided—for example by using different mechanical springs in parallel and locking out one or more of said springs to vary the stiffness or using magnetorheological (MR) fluid to vary the damping properties of a suspension system. Such systems may be referred to as passive control suspension systems, or semi-active suspension systems.

An active suspension system uses an actuator to move the wheel assembly relative to the vehicle body independently at each wheel. Thus, active suspension systems are based on actuator operations, and do not just change the properties of a spring or damping system.

Active suspension systems are used on a variety of automotive vehicles, but are not yet in widespread commercial use.

A key challenge for active suspension systems is to provide at short notice the high power output that is required when the vehicle encounters more severe road events, for example bumps in the road (such as speed bumps), and in particular to do so without impacting adversely on the driving experience (for example by drawing excessive amount of power from the engine) and/or without requiring a large valves/pumps and therefore requiring a large amount of space on the vehicle.

Current state of the art active suspension systems often rely on electro-mechanical actuators, such as linear electro-mechanical actuators. Suspension systems having electro-mechanical or electro-hydraulic control may require a significant amount of power in order to provide the range of movement required in a suspension system. They also may require prediction algorithms and/or map data for the road ahead.

Additionally, state of the art electro-hydraulic systems typically have relatively slow response times. While this can be offset somewhat by using forward sensing to provide an indication of forthcoming road events it limits the responsiveness of the system; forward sensing increases the complexity of the system, and limits the types of road events or driver inputs that the active suspension system can respond to.

More generally, it is desirable to provide active suspension systems that are more space and/or power efficient and/or less mechanically complex (with the attendant benefits in terms of cost and/or reliability).

The present disclosure seeks to mitigate the above-mentioned problems. Alternatively or additionally, the present disclosure seeks to provide an improved suspension system and/or an improved method of controlling the length and/or reaction force of a hydraulic actuator of an active suspension system.

SUMMARY

In a first aspect of the disclosure there is provided a suspension system for an automotive vehicle, the suspension system comprising: a hydraulic actuator for mounting between a wheel assembly and a body of the automotive vehicle, and a hydraulic system configured to provide a supply of fluid to the hydraulic actuator, and for example thereby control the length, stiffness and/or or damping properties of the hydraulic actuator or the force exerted by the hydraulic actuator, wherein the hydraulic system is configured during normal operation to provide fluid at a static pressure greater than 7 MPa (70 Bar) to the hydraulic actuator.

Thus, in contrast to the prior art automotive suspensions systems, the present disclosure uses a "high-pressure", for example, pressures greater than 7 MPa (70 Bar, or roughly 1000 PSI) in normal operation, hydraulic system to control a "high-pressure" hydraulic actuator. Use of such a high-pressure hydraulic suspension system means that the amount of fluid that must be moved around within the system is small (fluid power being proportional to pressure multiplied by fluid flow) compared to a low pressure system of comparable power—for example, flow rates may be less than 20 litres per minute at peak power output. Reducing the amount of fluid that needs to be moved around the system may allow for a more compact suspension system and/or a more responsive system. Additionally or alternatively, a "high pressure" system reduces the risk of cavitation effects.

The hydraulic system may be configured to provide fluid at a total pressure greater than 10 MPa (100 Bar), for example greater than 15 MPa (150 Bar), for example greater than 18 MPa (180 Bar) in normal operation. The higher the pressure, the less fluid is needed in the suspension system.

An active suspension system for a vehicle may be defined as a system in which energy is provided to an actuator (such as the hydraulic actuator) in order to control the relative motion of a vehicle wheel and chassis in response to road conditions. An actuator may be able to apply a force in a first direction and/or a second, opposite, direction. An actuator may be able to increase and/or decrease in length. Thus, it is possible to define four quadrants of control as follows: increase in length while applying force in the first direction, increase in length while applying force in the second direction, decrease in length while applying force in the first direction and decrease in length while applying force in the second direction. An active suspension system may be defined as one that can operate in three or more quadrants of control. For example, an active suspension system may operate in four quadrants of control. This is in contrast to a passive system, which may only operate in two: increasing in length while applying force in the first direction and decrease in length while applying force in the second direction. Without wishing to be bound by theory, this is because an active system can both put energy in to the hydraulic actuator and take energy out.

The suspension system may comprise a common flow path that connects the hydraulic system to the hydraulic actuator, for example such that fluid can flow between the hydraulic system and the hydraulic actuator via the common flow path. The common flow path may be a bi-directional flow path.

The hydraulic system may comprise a plurality of gas accumulators. Each gas accumulator may comprise a gas reservoir (for containing a compressible gas) and a fluid reservoir (for containing an incompressible fluid). The gas and fluid reservoirs may be separated by a barrier such pressure can be transmitted between the gas and fluid reservoirs. In use, the gas reservoir may contain a compressible gas. In use, the fluid reservoir may contain incompressible fluid as used in the common flow path and rest of the hydraulic system. Each accumulator may comprise at least on air fill valve configured for connection to a supply of compressible gas. A gas accumulator may be referred to as simply an "accumulator" in this specification.

It may be that each of said gas accumulators (for example the fluid reservoir of each accumulator) is connected to a common flow path, for example such that changes in fluid pressure in the common flow path are transmitted to the gas in said accumulator. The common flow path may connect the hydraulic system to the hydraulic actuator, for example such that each gas accumulator is connected to the actuator via the common flow path. Each gas accumulator may be independently connected to the common flow path, for example so that fluid may flow between the accumulator and the common flow path independently of whether fluid is flowing between another of the accumulators and the common flow path. The hydraulic system may comprise one or more valves. A valve may be associated with each one of the plurality of gas accumulators. A valve may be said to be associated with an accumulator when opening or closing said valve determines whether fluid can flow from the gas accumulator to the common flow path. A valve may be associated with more than one accumulator. It will be understood that, as used here, 'connected' means that there is a potential path for fluid to flow between the connected elements. It will be appreciated that whether fluid flows along said potential path will depend on the position of any valves (e.g. open or closed) along said path.

The hydraulic system may comprise a pump connected to the or each gas accumulator, for example via the common flow path.

The common flow path may comprise a portion of flow path (the nexus or common portion) through which fluid flowing to or from the plurality of gas accumulators and/or the pump to the hydraulic actuator passes, for example such that the pressure provided by the hydraulic system to the hydraulic actuator at any point in time may be defined as the pressure of fluid in said common portion.

The suspension system may be configured such that pressure in the common flow path is transmitted to gas in the gas reservoir of an accumulator when the associated valve is open. In this way, it may be that gas in the accumulator is compressed when the pressure in the common flow path increases and/or expands when pressure in the common flow path decreases. Thus, it may be that gas of each accumulator acts as a compressible spring, when compressed by the fluid in the system. In other words, the volume of compressible gas in the gas accumulators in fluid communication with the common flow path may determine the stiffness of the hydraulic system (and thus the stiffness of the hydraulic actuator). The system may be configured such that the accumulators can be switched into and out of fluid communication with the common flow path to vary the volume of gas in communication with the common flow path and thereby vary the stiffness of the actuator.

The plurality of gas accumulators may be connected the common flow path at locations spaced apart along the length of the flow path. The common portion may be located on the flow path between the plurality of gas accumulators (on one side) and the hydraulic actuator (on the other side).

The plurality of accumulators may comprise a first accumulator configured to contain a first volume of gas at a reference pressure, and a second accumulator configured to contain a second volume of gas at the same reference pressure, wherein the first and second volumes are different. The first volume may be lower than the second volume (in which case the first and second accumulators may be referred to as smaller and larger volume accumulators respectively).

Use of a plurality of accumulators allows a smaller pump to be used in the hydraulic circuit for a given total pressure provided to the hydraulic actuator, as pressurised fluid may be built up in some of the accumulators over time, rather than being provided instantaneously. Additionally or alternatively, this approach may lead to a more efficient suspension system and/or reduce the impact on driving experienced by avoiding peaks and troughs in the power required from the pump. Using accumulators may allow this to be achieved in a space efficient and mechanically simple way. Additionally or alternatively, providing accumulators with different volumes of compressible gas connected to the common flow path may allow for a variable stiffness active suspension system and a more responsive active suspension system because the different accumulators can be connected and disconnected quickly thereby allowing rapid changes in the properties of the suspension system. Use of a plurality of accumulators may provide for a more responsive system than when compared with, for example, hydraulic systems where the spring rate is changed by varying the pump rate of a pump in the hydraulic system or increasing or decreasing the stiffness of the system through use of an actuator or the like. This may be particularly advantageous in active suspension systems, where having a quick response time may be essential to be able to react to surface conditions present on the road ahead.

Preferably, the active system has a response time of less than 10 ms, and even more preferably a response lime of less than 5 ms. A response time may be defined as the time needed between a control system initiating a change in the properties (e.g. the stiffness, force, length or damping) of the hydraulic actuator and the change being achieved.

The suspension system may be configured such that the hydraulic pressure in the common flow path is transmitted to the hydraulic actuator such that the stiffness (spring rate k) of the hydraulic actuator is determined (at least in part, for example primarily or substantially determined) by the total volume of compressible gas in fluid communication with the common flow path.

The system may be configured to transmit changes in fluid pressure between the hydraulic actuator, common flow path and gas accumulators such that the hydraulic actuator has a first stiffness when the hydraulic system is in the first configuration and a second, different, stiffness when the hydraulic system in the second configuration. The suspension system may be configured such that the fluid pressure in the common flow path is transmitted to at least one chamber of the hydraulic actuator, for example without significant pressure loss other than normal pipe flow losses.

Each accumulator of the plurality of gas accumulators may have a spring rate or spring constant associated with it. For example, it may be that a gas accumulator configured to hold a smaller volume of gas at the reference pressure has a higher spring rate associated with it in comparison to a gas accumulator configured to hold a larger volume of gas at that same reference pressure. The suspension system may be configured such that changing which of the gas accumulators of the plurality of gas accumulators are in fluid communication (i.e. the associated valve being partially or fully open) with the common flow path changes the spring rate of the hydraulic actuator. The common flow path may be configured such that the connection of the gas accumulators to the common flow path allows for a summation of the spring rates of the gas accumulators (i.e. akin to connecting springs in series). It may be that each gas accumulator is configured to contain a different volume of gas at the reference pressure to any other accumulator. Thus, it may be that each of the plurality of gas accumulators has a different spring constant associated with it.

It may be that the hydraulic system is arranged to be switched between a first configuration in which a the valve associated with a first gas accumulator is in an open position and the valve associated with a second, different, gas accumulator is in a closed position, and a second configuration in which the valve associated with a first gas accumulator is in a closed position and/or the valve associated with the second gas accumulator is in an open position. It may be that the valve associated with the first accumulator is in the open position in the second configuration.

The hydraulic system may also be arranged to be switched to a (third or further) configuration in which the valve associated with the first gas accumulator is closed and the valve associated with the second gas accumulator is open. The hydraulic system may also be arranged to be switched to a (fourth or further) configuration, in which the valve associated with the first gas accumulator and the valve associated with the second gas accumulator is closed.

It may be that the hydraulic system is configured to be switched between any of the first, second, third and fourth configurations.

The plurality of gas accumulators may further comprise a third accumulator, for example a variable accumulator. A variable accumulator may be configured such that the volume of compressible gas contained in the gas reservoir at a reference pressure is variable. For example, the volume of the gas reservoir may be increased or decreased by changing the relative position of the barrier between the gas and fluid reservoirs, for example in response to a control signal. The variable accumulator may have a variable representative spring rate associated with it. The variable accumulator may be connected to the common hydraulic path. There may be a valve associated with the variable accumulator to control the flow of fluid between the accumulator and the common hydraulic path. The variable accumulator may be connected to the pump. For example the hydraulic system may be configured such that fluid can flow between the pump and the variable accumulator in both directions (i.e. to and from the pump). It will be appreciated that the provision of another accumulator gives rise to additional modes/configurations of operation, depending on whether the valve associated with the accumulator is open or closed.

Providing a variable accumulator may allow for adjustment of the stiffness of the hydraulic actuator, for example to take account of temperature or other effects that may impact on the hydraulic actuator stiffness achieved by the fixed-volume (e.g. the first and/or second) accumulators. Thus, providing a variable accumulator may allow the system to achieve a target properties of the hydraulic actuator over a wide range of environmental conditions and/or over a long period of time (e.g. be compensating for any 'drift' as a result of wear and tear on the system over long service). Additionally or alternatively, provision of the variable accumulator as a source of pressurised fluid to the pump may allow for more efficient operation of the pump and/or increased power efficiency of the system by allowing the conservation of pressure in the fluid that might otherwise be lost. Additionally or alternatively, the variable accumulator can be used to accommodate a different volume of gas depending on the mode of operation, thereby reducing the number of fixed-volume accumulators required. The volume of gas in the variable accumulator may be (indirectly) controlled by increasing or decreasing the amount of fluid that is forced in the variable accumulator. Alternatively or additionally, the volume of gas in the variable accumulator may be controlled by increasing or decreasing the amount of gas that is fed to the variable accumulator through the air fill.

It may be that different ones of (for example each of) the plurality of gas accumulators are associated with one or more different valves. The one or more valves may be a number of separate valves. For example, a separate valve may be positioned between each of the accumulators and the common flow path. Each said separate valve may be part of a servo valve, as described below.

Additionally or alternatively, the hydraulic system may comprise a (main) valve that is associated with more than one accumulator. For example, the hydraulic system may comprise a (single) valve associated with each of the plurality of accumulators, such that the same valve controls the flow of fluid from the first, second, third (if present) and/or any further accumulators. Thus, it may be that the system is switched between first and second configurations (and optionally the third, fourth and any further configurations) by said valve. Thus, a single valve may be associated with more than one of the accumulators. Use of a single valve may allow for a more compact and/or mechanically simpler suspension system. In the case where the single valve comprises a spool mounted for movement with respect to a sleeve (such as if the single valve is a servo valve, as described below), the position of the spool relative to the sleeve may determine for each of the first, second and/or third accumulators whether said accumulator is in fluid communication with the common flow path.

The or each valve may be a servo valve. Thus, a number of separate valves may be (mechanically) comprised in a servo valve. The servo valve may comprise a spool mounted for movement with respect to a sleeve. The servo valve may be configured such that movement of the spool relative to the sleeve controls the flow of fluid through the valve. For example, one or more inlet ports and one or more outlet ports may be formed in the sleeve and movement of the spool may determine the flow paths between said ports. It may be that the spool has one or more lands or grooves formed therein, and, in use, fluid flows between the inlet and outlet ports via said lands or grooves. The servo valve may be configured such that the position of the spool determines whether and which of the accumulators of the plurality of accumulators are in fluid communication with the common flow path. The servo valve may be a multi-way (for example, a six-way)

servo valve. In this way, a single servo valve may control the operational states of the hydraulic system, and thus determine which of the plurality of accumulators along the common flow path are in fluid communication with the common flow path. Use of a single servo valve may provide for a more compact and/or mechanically simpler suspension system. Additionally or alternatively, use of a servo valve may provide a more responsive suspension system as a servo valve allows for rapid switching between configurations. Additionally or alternatively, use of such a valve may increase the power efficiency of the system as only a small amount of power is required to move the valve between different states (and thereby change the damping, length and/or stiffness of the hydraulic actuator). The sleeve of the servo valve may be integrally formed with a manifold or housing of the active suspension system. The sleeve of the servo valve may be formed using an additive manufacturing technique.

The servo valve may be a rotary servo valve in which the spool is mounted for rotation relative to the sleeve. The servo valve may be a linear servo valve in which the spool is mounted for axial displacement relative to the sleeve. The spool may be mounted relative to the accumulators such that the accumulators are arranged in series substantially parallel to the axial length of the spool.

The servo valve may allow for independent inclusion and exclusion (i.e. it may allow fluid communication, or disallow fluid communication) of a given accumulator of the plurality of accumulators from the common hydraulic line.

The servo valve may be a direct drive valve. Thus, the servo valve may comprise a motor configured to move the spool relative to the sleeve. Use of a direct drive valve (i.e. a valve where the spool is directly driven by an actuator) may allow yet further miniaturisation of the system, and may allow for precise switching between operational states, at high frequency and with quick response time.

It may be that the hydraulic system comprises one or more proportional valves, for example a proportional valve located on the flow path between one or more of the accumulators (for example the first and/or second accumulators) and the common flow path and/or between the common flow path and one or both of the chambers of the hydraulic actuator. A proportional valve may be defined as a valve that can occupy more than one open position, such that the non-zero flow rate of fluid through the valve can be varied. The suspension system may be configured such that varying the position of said proportional valve(s) varies the damping ratio of the hydraulic actuator. It will be understood that the pressure drop or loss across such a valve corresponds to a dissipation of hydraulic power and accordingly such valves can dissipate the oscillations of the actuator. The proportional valve may be a variable orifice valve. Varying the flow rate through the proportional valve(s) may also vary the spring rate of the hydraulic actuator. The suspension system may be configured such that varying the position of said proportional valve(s) varies the spring rate of the hydraulic actuator.

Use of such a proportional valve allows the damping provided by the suspension system to be varied in response to road conditions, thereby improving the performance of the automotive vehicle. Additionally or alternatively, using proportional valve(s) to provide such damping allows for the damping properties to be changed with minimal power output (as only the position of the valve needs to be actively changed), thereby increasing the power efficiency of the system. This is in comparison with other systems where large quantities of fluid may need to be pumped around the system in order to change the damping properties. Additionally or alternatively, using proportional valve(s) to provide such damping allows for the damping properties to be changed rapidly (as only the position of the valve needs to be changed, which can be done more quickly than when large quantities of fluid must be moved around a circuit). Additionally or alternatively, use of a proportional valve may allow for the provision of variable damping in a space-efficient and/or mechanically simple manner (it may be that the only additional mechanical element required is the proportional valve).

The hydraulic system may comprise a valve that is associated with one or more accumulators and/or is a proportional control valve (or valves) as described above. That is to say, the same valve (a single valve) may provide control (on/off and/or proportional) of the flow of fluid between one or more of the accumulators and the common flow path, and/or provide proportional control of the flow between the hydraulic actuator and the common flow path. That valve may be a servo valve as described above. Use of a single valve to do most or all of the switching in the hydraulic system may reduce the mechanical complexity and/or provide a more cost and/or space efficient system. Thus, in the case where or each valve is a servo valve, the servo valve may comprise one or more proportional valves to allow for independent proportional control (i.e. it may allow a relatively large amount fluid communication, or a relatively small amount of fluid communication) of a given accumulator of the plurality of accumulators from the common hydraulic line.

It may be that the hydraulic actuator comprises a piston comprising a rod and a piston head mounted on the rod and a piston housing. It may be that the piston is mounted for movement within a cavity formed within the piston housing. It may be that a first side and a second side of the piston head divides the cavity into a first chamber and a second chamber. The effective surface area of the first side of the piston head may be larger than the effective surface area of the second side of the piston head. Effective surface area refers to surface area of the piston head on which the component of pressure acts parallel to the longitudinal axis of the rod. For a surface perpendicular to the longitudinal axis of the rod, the effective surface area would be equivalent to the surface area exposed to the fluid pressure. For a surface inclined relative to the longitudinal axis of the rod, the effective surface are will be a function of the angle of the surface and the surface area exposed to the fluid pressure. For a surface parallel to the longitudinal axis of the rod, the effective surface area will be zero. The hydraulic actuator may be configured such that in use, the first side of the piston head defines at least in part the first chamber and the second side of the piston head defines at least in part the second chamber. The rod may be configured such that movement of the rod in a first direction relative to the sleeve results in an increase in the length of the actuator (i.e. extension of the actuator) and movement of the rod in a second, opposite, direction relative to the sleeve results in a decrease in the length of the actuator (i.e. retraction of the actuator).

It may be that the first chamber is connected to the common flow path via at least one first piston flow path. It may be that the second chamber is connected to the common flow path via at least one second piston flow path. The system may be configured such that fluid can flow in both directions along the first piston flow path(s) and the second piston flow path(s). The system may be configured such that a change in pressure in the common flow path is transmitted to both the first and second chambers, for example via the first and second piston flow paths respectively, for example such that the same pressure change is applied to both chambers. Thus, it may be that an increase in pressure in the common flow path results in an increase in pressure in both the first and second chambers and/or a decrease in pressure in the common flow path results in a decrease in pressure in both the first and second chambers. This means that when the pressure is increased (or decreased) in the common flow path, for example by increasing (or decreasing) the flow output of a motor, an equal pressure change (a pressure drop or a pressure increase) is applied to the fluid in the first and second chambers. The system may be configured such that an increase in pressure caused by operating the pump is transmitted along the common flow path to both the first and second chambers simultaneously.

The effective surface area of the first side of the piston head may differ from the effective surface area of the second side of the piston head such that applying the same change in pressure to the first and second chamber will result in a net force on the piston head. This is because F=P×A, where F is force, P is pressure, and A is effective area. Thus, a larger force will be felt by the first side of the piston head, than the second side of the piston head where the first effective area is greater than the second effective area. Thus, by increasing or decreasing the pressure in the common flow path (particularly at the common portion), the magnitude and direction of the resultant force can be controlled, and the length of the hydraulic actuator can be increased or decreased. Unlike prior art systems, a complicated series of check valves (one directional or non-return valves) is not required in order to raise or lower the hydraulic actuator.

The suspension system may comprise one or more variable resistance valve(s) (for example one or more proportional valves—the degree to which a valve is open being inversely proportional to its resistance) located on either (i) the or each first piston flow path or (ii) the or each at least one second piston flow path. The system may be configured such that such that varying the resistance of the variable resistance valve(s) varies the damping rate of the hydraulic actuator. It may be that there is no variable resistance valve on the second flow path, or that such a valve is present but held in a constant position, or the position of such a valve is changed, but in a different manner to the first flow path. The variable resistance valve may be a two way valve, configured to provide a damping in both directions. The variable resistance valve may be configured such that the damping across the valve is substantially the same in both directions. It may be that there is no check valve (one directional or non-return valve) located between the common flow path and the hydraulic actuator, for example along the first and/or second piston flow paths.

The piston head may fit within the interior of the housing such that there is substantially no flow between the first and second chambers around the piston head (substantially no flow may be defined as less than 0.5 litres per minute). The maximum diametrical clearance between the piston head and sleeve may be 0.030 mm. It may be that the first and/or second chamber is configured to retain fluid at a total pressure of 7 MPa (70 Bar) or more. It may be that the first and/or second chamber is configured to retain fluid at a total pressure of 10 MPa (10 Bar) or more.

It may be that a first portion of the rod is located within the first or second chamber and a second portion of the rod is located outside of the piston housing. Thus, the rod may be located partially within the piston housing. It may be the piston housing comprises a sealing region, the sealing region being the region of the housing between said first or second chamber and the exterior of the housing through which the rod extends. For example, the piston housing may comprise an end region having a through-hole through which the piston extends. The piston housing may comprise at least one seal located in the sealing region, for example in the through-hole, and arranged to form a seal between the piston housing and the rod. The piston housing may comprise at least one scavenge port, for example a plurality of scavenge ports said scavenge port(s) being located in said sealing region. The scavenge port(s) may be located in the sealing region between the at least one seal and the first or second piston chamber such that, in use, fluid that enters the sealing region from a piston chamber can exit the sealing region via the scavenge port(s).

Having a scavenge port or ports located between the orifice thorough which the rod leaves the chamber and the seal which prevents fluid leaking from the interior of the piston housing to the exterior of the piston housing (e.g. being lost from the hydraulic system) may reduce the pressure that the seal needs to withstand and thereby the friction between the seal and the rod (a seal that must withstand a higher pressure requiring a much tighter fit around the rod than a seal that is rated for a lower pressure). This may reduce energy lost to overcoming that friction and/or reduce hysteresis in the movement of the rod. It may be that the or each at least one seal is configured to withstand a pressure of 0.2 MPa (2 Bar) or less. Examples of appropriate seals include the Trelleborg Glyd Ring Hz and/or the Trelleborg Double Delta, which may be used in combination. It may be that the maximum diametrical clearance between the rod and sealing region is 0.01 mm or less. The or each seal may have an operational friction in the in the region of 20 N to 30 N with the rod.

The suspension system may comprise a scavenge reservoir connected to the at least one scavenge port, for example via a scavenge flow path, such that, in use, fluid can flow from the scavenge port(s) to the scavenge reservoir. The scavenge reservoir may be an accumulator, and may be referred to as the scavenge accumulator. The scavenge reservoir may be configured to contain fluid at a total pressure of 0.2 MPa (2 Bar) or less. Thus, the suspension system may comprise a first gas accumulator, a second gas accumulator and a scavenge accumulator. The scavenge reservoir may be connected to the common flow path and/or the pump. Thus, in use, fluid that leaks from the piston chamber around the rod may be returned to the hydraulic system (e.g. the common path) via the scavenge port(s) and reservoir and, optionally the pump. Such an arrangement may prevent loss of hydraulic fluid from the system in a mechanically simple and compact way. Additionally or alternatively, as well as reducing fluid loss from the system, the scavenge reservoir may provide damping and/or pressurised fluid to the hydraulic actuator via the common line thereby increasing the degree of control over the properties of the hydraulic actuator (e.g. the stiffness, force, damping and/or length) thus, the scavenge system as describe herein may provide two functions via the same reservoir. The suspension system may comprise a valve located on the flow path between the scavenge accumulator and/or the pump to control the flow of fluid therebetween.

The hydraulic system may comprise a pump. The pump may be connected to the common flow path such that, in use, fluid can flow between the pump and the common flow path, for example in both directions. The pump may be connected to the or each accumulator and/or the scavenge reservoir such that, in use, fluid can flow between the pump and the accumulator, for example in both directions. One or more valves may be associated with the pump to control the flow of fluid to or from the pump and/or between the pump and the common line, accumulators and scavenge reservoir. The suspension system may be configured such that an increase or decrease in the total pressure in the common flow path can be transmitted to the hydraulic actuator. The hydraulic system may be configured such that the pump can increase or decrease the pressure in the common flow path. The pump may be configured to run both forwards and backwards. The pump may be directly connected to the common flow path. The pump may be configured to provide pressurised fluid at a total pressure of 10 MPa (100 Bar) or more.

The pump may be a variable displacement pump. A variable displacement pump may be configured to output fluid at different flow rates and/or total pressures at different times and in dependence on a control signal. Providing a variable displacement pump may provide a more power efficient suspension system. The variable displacement pump may comprise a series of fixed displacement pumps (for example two or more fixed displacement pumps) that are controlled by a geared motor, such that the displacement of the variable displacement pump can be controlled.

The pump may be a radial piston pump. The pump may be a radial piston pump comprising a rotor having a plurality of pump piston chambers; a first set of pistons and/or a second set of pistons received in said pump piston chambers. The radial piston pump may further comprise a first cam surface and/or a second cam surface. The rotor may be mounted for rotation relative to the first cam surface (if present) and the second cam surface (if present), the first cam surface being arranged to control the radial movement of the pistons of the first set, and the second cam surface being arranged to control the radial movement of the pistons of the second set. The radial piston pump may comprise a valve configured to control the flow of fluid to the first set of pistons and/or the second set of pistons. The radial piston pump may comprise a valve configured to control the flow of fluid to and/or from both the first set of pistons and the second set of pistons. The valve or each valve may be configured to switch the radial piston pump from a first configuration to a second configuration by altering the flow of fluid to or from the second set of pistons independently of the first set of pistons.

Thus, it may be that in the radial piston pump, the same valve switches the flow to or from both sets of pistons independently (e.g. switches the flow to one set of pistons without substantially altering the flow to or from the other set of pistons). Use of a single valve to control the flow associated with the various different layers may provide a variable displacement pump with a reduced part count (and therefore reduced mechanical complexity) in comparison with other variable displacement pumps and/or allow for a more compact variable displacement pump for a given flow rate.

The pump may be a dual displacement pump comprising a first pump assembly and a second displacement pump assembly, each pump assembly being configured to provide fluid at a different flow rates and/or total pressures. It may be that the first set of pistons form part of the first pump assembly and the second set of pistons form part of the second pump assembly.

The pump may comprise a motor configured to drive the pump. The motor may comprise a stator and a rotor mounted for rotation relative to the pump. The pistons of the pump may be received in piston chambers formed in the rotor of the motor.

The same (main) valve may control the flow of fluid to or from the pistons (switch the pump between different configurations and be associated with the accumulators, scavenge reservoir (if present). Thus, the hydraulic system may comprise a valve associated with the first, second, third (if present) accumulators and the scavenge reservoir (if present) and configured to control the output of the variable displacement pump.

The hydraulic system may comprise a return valve (for example the main valve may also be the return valve) arranged on a flow path between the common flow path and the scavenge reservoir such that, when the return valve and the valve associated with the scavenge reservoir are both open fluid from the common flow path flows to the scavenge reservoir. Providing such a return valve may allow the total pressure in the common path to be rapidly reduced thereby increasing the versatility of the suspension system and enabling a rapid retraction of the actuator.

The fluid may be hydraulic fluid, for example an incompressible fluid.

The suspension system may comprise a control system configured to operate the or each valve of the system. The control system may be configured to open or shut or control the non-zero position of each valve. The control system may be configured to control the operation of the pump, for example to control the motor to drive the pump. The control system may be configured to receive one or more inputs, for example user of sensor inputs and, in dependence on the inputs so received, change the position or one or more valves or drive the pump in order to achieve a desired set of properties (stiffness, force, length and/or damping) of the hydraulic actuator. The control system may comprise a feedback system providing one or more indications regarding the properties of the hydraulic actuator.

In a second aspect of the disclosure there is provided a suspension system for an automotive vehicle, the suspension system comprising:

a hydraulic actuator for mounting between a wheel assembly and a body of the automotive vehicle, and a hydraulic system configured to provide a supply of fluid to the hydraulic actuator and thereby control the length, force, stiffness and/or or damping properties of the hydraulic actuator;

the suspension system comprising a common flow path connecting the hydraulic system to the hydraulic actuator; and the hydraulic system comprising a first gas accumulator and a second gas accumulator, each accumulator being connected to the common flow path via an associated valve such that, in use, when the associated valve is open, fluid can flow from each accumulator to the hydraulic actuator via the common flow path (and vice versa) and wherein the hydraulic system is configured to switch between the following modes of operation:

a first mode of operation, wherein the valve(s) are configured such that fluid is able to flow between the first gas accumulator and the common flow path and fluid is unable to flow between the second gas accumulator and the common flow path; and a second mode of operation, wherein the valve(s) are configured such that fluid is able to flow between the first gas accumulator and the common flow path and fluid is able to flow between the second gas accumulator and the common flow path.

The suspension system of the second aspect may have any other features of the suspension system described above with reference to the first aspect, or any other aspect of the method or apparatus.

In a third aspect of the disclosure there is provided a suspension system for an automotive vehicle, the suspension system comprising a hydraulic actuator for mounting between a wheel assembly and a body of the automotive vehicle, wherein the hydraulic actuator comprises:

a piston housing and a piston comprising a rod and a piston head mounted on the rod, the piston is mounted for movement within a cavity formed within the piston housing and a first side and a second side of the piston head divides the cavity into a first chamber and a second chamber;

the piston housing further comprising a sealing region being the region of the housing between the first or second chamber and the exterior of the housing through which the rod extends;

at least one seal located in the sealing region and arranged to form a seal between the piston housing and the rod; and at least one scavenge port located in said sealing region between the at least one seal and said first or second piston chamber such that, in use, fluid that enters the sealing region from said chamber can exit the sealing region via the scavenge port.

The suspension system of the third aspect may have any other features of the suspension system described above with reference to the first aspect, or any other aspect of the method or apparatus.

In a fourth aspect of the disclosure there is provided a suspension unit comprising the suspension system of any other aspect. The unit may be a self-contained discrete unit. It may be that the hydraulic system is contained within a housing of the unit, and that at least part of the hydraulic actuator, for example a rod of the hydraulic actuator, is located partially within the housing of the unit.

Provision of the active suspension system in a self-contained unit may facilitate mounting the active suspension system to the vehicle and/or reduces the risk of leakage/pressure loss associated with suspension systems that make use of a central or distributed hydraulic system. It may be that when the hydraulic actuator is fully retracted the length (the longest dimension of the unit) of the unit is less than 400 mm, for example 300 mm or less. It may be that the weight of the unit (including the hydraulic fluid) is less than 7 kg, for example 4 kg or less.

It may be that the hydraulic actuator comprises a rod mounted for axial movement within the housing and extending parallel to a longitudinal axis of the unit. It may be that the hydraulic system comprises a first gas accumulator, a second gas accumulator and (optionally) a third gas accumulator, the accumulators being arranged in a row along a portion of the length of the unit. It may be that adjacent accumulators share a common wall. It may be that the rod extends along and adjacent to a first side of the unit. It may be that the accumulators are spaced apart from the first side of the unit. It may be that the accumulators are spaced adjacent a second side of the unit, the second side being opposite the first side. The piston housing or sleeve and one or more of the accumulators may share a common wall. Such a layout may be particularly space efficient and/or allow for structure defining different elements to be integrally formed thereby saving weight and/or cost.

The pump and/or (main) valve may be arranged in a row with the first, second and (if present) third gas accumulators.

For example, the valve may be arranged coaxially (for example concentric to and/or within) the rotor of the pump, and the pump/valve assembly may be arranged in a row with the accumulators along the length of the unit, for example on the opposite side of the unit to the rod. Again, such a layout may be particularly efficient in terms of both space and structure.

The suspension unit may comprise a pump manifold including a cavity arranged to accommodate the pump. The pump manifold may include a plurality of flow galleries, each flow gallery extending between an inlet or outlet port of the manifold and the cavity to form a flow path via which fluid flows to or from the pump. One or more of said galleries may be a curvilinear flow gallery. A curvilinear flow gallery may be defined as a flow gallery that curves along the majority of its length (e.g. from the inlet or outlet port to the cavity), said curvature being in two planes such that the flow gallery follows a non-linear path in all three dimensions. Use of such curvilinear flow galleries may allow the flow galleries to be arranged within the pump manifold in a more space efficient manner. The pump manifold may be of a single piece construction. The pump manifold (including the curvilinear flow galleries) may be formed as a single piece using additive manufacturing. Use of additive manufacture may facilitate cost-efficient production of a manifold including curvilinear flow galleries with complex geometries.

The pump and/or (main) valve may be located within a pump and control unit of the suspension unit. The pump and control unit may further comprise a pump manifold. The pump and control unit may include one or more ports (e.g. inlet ports and/or outlet ports) via which fluid can flow between the accumulator(s) and the pump. The pump and control unit may be a modular unit configured for attachment to the rest of the suspension unit.

The suspension unit may comprise at least one accumulator, for example a plurality of accumulators. Each accumulator may be a modular accumulator. A modular accumulator may be a self-contained unit that defines the gas reservoir and the fluid reservoir and comprises the barrier. Each accumulator may comprise an accumulator housing and a port in said housing via which hydraulic fluid can enter and leave the accumulator. The plurality of modular accumulators may be configured such that the accumulators can be stacked together, for example with a portion of one of said accumulators received in a recess in a surface of another one of said accumulators. For example, an end portion of one of said accumulators may be received in a recess formed in an end surface of another of said accumulators. It may be that the hydraulic system comprises a first gas accumulator, a second gas accumulator and a third gas accumulator and each of the first gas accumulator, second gas accumulator and third gas accumulator is a modular accumulator. The first, second and (if present) third gas accumulators may be modular accumulators stacked together in a row. Use of modular accumulators in the suspension unit may reduce manufacturing costs and/or enable the production of a wider range of suspension units as modular accumulators of different sizes can easily be included in the suspension unit in different combinations in order to provide the required hydraulic systems performance.

The pump and control unit may be arranged at one end of the row of modular accumulators.

The unit may further comprise one or more pipes, for example rectilinear pipes arranged to provide a fluid connection between and inlet or outlet port of the pump and control unit and the port of the accumulator. The combination of additive manufacture in the pump manifold with conventional pipes in the rest of the suspension unit may enable cost effective manufacture of a high-performance suspension unit. The relatively more expensive additive manufacture can be used to produce the complex flow paths required for a space efficient pump manifold, while more conventional components (e.g. rectilinear pipes) are used elsewhere in the suspension unit, for example to connect the pump and control unit to the modular accumulators.

According to a fifth aspect of the disclosure, there is provided a method of controlling the relative movement of a wheel assembly and a body of an automotive vehicle using a suspension system comprising a hydraulic actuator connecting the wheel assembly and the body and a hydraulic system configured to provide a supply of fluid to the hydraulic actuator and wherein the hydraulic system provides fluid to the hydraulic actuator at a total pressure equal to or greater than 7 MPa (70 Bar) for a first time period.

It may be that the hydraulic system comprises a first accumulator and/or a second accumulator connected to a common flow path. It may be that the stiffness of the hydraulic actuator is determined by the total volume of compressible gas in fluid communication with the primary flow path at a reference pressure. It may be that, during the first time period, the first accumulator retains a first quantity of gas (corresponding to a first volume of gas at a reference pressure) and the second accumulator retains a second, different, quantity of gas (corresponding to a second volume of gas at the reference pressure). It may be that during the first time period the flow of fluid between one or both of the first and second accumulators and the common line is stopped or started thereby changing the quantity of compressible gas in fluid communication with the common flow path and accordingly, changing the stiffness of the hydraulic actuator. It will be appreciated that, during the first time period, while the total pressure in the common flow path may change it remains greater than 7 MPa (70 Bar).

It will be appreciated that the volume occupied by a quantity of gas will vary depending upon the pressure. The relative quantity of gas in each accumulator may be determined by comparing the volume occupied by the gas in each accumulator at a given reference pressure.

The period of time for which a particular combination of accumulators are in fluid communication with the common flow path (i.e. the valve associated with those accumulators are open) may be referred to as a sub-period. Thus, the first time period may comprise a plurality of sub-periods, one sub-period ending and the next beginning when the flow of fluid to one or more accumulators is stopped or started.

The method may comprise varying the non-zero position of a variable resistance valve located on a piston flow path during the first time period, for example during a sub-period of the first time period, to change the damping rate of the hydraulic actuator. The method may comprise varying the non-zero position of the valve during a sub-period.

The method may comprise, during the first time period, for example during a sub-period of the first time period, operating the pump to vary the total pressure in the common flow path to change the length of the hydraulic actuator. This is optionally during a sub-period of the first time period, the first time period comprising a plurality of such sub-periods, one sub-period ending and another beginning when the flow of fluid to one or more accumulators is stopped or started.

It may be that the hydraulic actuator comprises a piston having a first piston chamber on one side of a piston head and a second piston chamber on the other side of the piston head, wherein a first side of the piston head on the side of the first piston chamber has an effective surface area that is larger than the effective surface area of a second side of the piston head on the side of the second piston chamber, the first chamber and second chambers being connected to the common flow path by different piston flow paths. It may be that increasing the pressure in the common flow path causes an increase in pressure in the first chamber and the second chamber, the difference in effective surface area resulting in a net force on the piston head such that it moves away from the first chamber to cause fluid to flow into the first chamber from the common flow path and to cause fluid to flow out of the second chamber. It may be that decreasing the pressure in the common flow path causes a decrease in pressure in the first chamber and the second chamber, the difference in effective surface area resulting in a net force on the piston head such that it moves away from the second chamber to cause fluid to flow out of the first chamber and to cause fluid to flow into the second chamber from the common flow path. Thus, varying the pressure in the common flow path causes the length of the hydraulic actuator to increase and decrease.

Thus, methods in accordance with the present disclosure may change the length of the hydraulic actuator by varying the total pressure in the common flow path. In other words, varying the total pressure in the common flow path allows for the mean length of the actuator to be changed. However, in the steady state, the length of the actuator is independent of the pressure in the common flow path. Thus, when fitted to a car, such a system allows for the mean ride height of the car to be adjusted, while still allowing for the hydraulic actuator to move up and down from the mean position to act as suspension. Such methods may therefore provide an active suspension system. This arrangement of the pump and the common flow path being in fluid communication with two chambers of the hydraulic actuator, and the difference in the surface area of the pistons within the hydraulic actuator, in combination with the high total pressure in the common flow paths, allows large movements of the actuator to be achieved at low power and/or rapidly because it is not necessary to pump large quantities of fluid around a circuit, instead small changes to the total pressure in the common flow path drive the displacement.

The method may comprise the pump exchanging fluid with the variable accumulator while the pump is operating to increase or decrease the total pressure in the common flow path, for example during the first time period or a sub-period thereof. The method may comprise the pump exchanging fluid with the scavenge reservoir while the pump is operating to increase or decrease the total pressure in the common flow path. In this connection, operating the pump may also comprise fluid collected in the scavenge reservoir being returned to the common flow path.

It may be that there is a tyre mounted on the wheel assembly. It may be that a scavenge accumulator is connected to a common flow path, said common flow path being in fluid communication with the hydraulic actuator. The method may comprise during the first time period, the flow of fluid between the scavenge accumulator and the common flow path starting, thereby rapidly removing high pressure fluid from the hydraulic actuator such that the hydraulic actuator decreases in length, the tyre decompresses, and the wheel assembly and the car body accelerate towards each other. The decompression of the tyre may cause the magnitude of the acceleration of the wheel assembly towards the car body to be greater than the magnitude of the acceleration of the car body towards the wheel assembly. For example, the magnitude of the acceleration of the wheel assembly towards the car body may be approximately 7 g or greater.

The magnitude of the acceleration of the car assembly towards the wheel may be approximately 1 g (where g is 9.81 m s$^{-2}$). It may be that the wheel assembly has a larger acceleration than the car body because of the decompression of the tyre. The decompression of the tyre causes a force to rapidly be applied to the wheel assembly, when the hydraulic actuator decompresses. The rapid removal of fluid from the hydraulic actuator may result in the removal of the force that is compressing the tyre, causing the tyre to rapidly decompress, and in doing so push the wheel assembly away from the ground.

The steps of operating the pump and/or varying the non-zero position of a variable resistance valve can be carried out multiple times with the first time period, or during a sub-period thereof. The steps of operating the pump and/or varying the non-zero position of a variable resistance valve can be carried out in different sub-periods. The steps of operating the pump and/or varying the non-zero position of a variable resistance valve can be carried out simultaneously and/or at different times during a sub-period or time period.

The steps of operating the pump, changing the accumulators in fluid communication with the common line and/or varying the non-zero position of a variable resistance valve may be carried out by the control system of the suspension system in response to one or more inputs. Inputs may include inputs from the driver of the vehicle, for example the driver selecting a different suspension mode (e.g. changing to a 'sport' drive mode from an 'economy' driving mode) or operating the steering wheel, accelerator and/or brake in a particular manner. Inputs may include sensor inputs from one or more sensors on the vehicle, for example accelerometers, speed sensors and/or remote sensing devices configured to detect upcoming road hazards.

The method may comprise the hydraulic system providing fluid to the hydraulic actuator at a total pressure equal to or greater than 7 MPa (70 Bar) for a second time period. The second time period may take place before or after the first time period. The second time period may comprise one or more sub-periods as described above. The method may comprise carrying out any of the steps discussed above during the second time period, or a sub-period thereof. The first or each time period may have a duration of more than 1 minute, for example more than 10 minutes.

The method may comprise, for a third time period, the return valve being open and the valve associated with a scavenge reservoir being open such that fluid from the common flow path flows to the scavenge reservoir thereby reducing the total pressure in the common line and causing the hydraulic actuator to retract. The valves associated with the or each accumulator may be closed throughout the third time period. The pump may be stopped during the third time period. Immediately prior to the third time period the total pressure in the scavenge reservoir may be less than the pressure in the accumulators, for example the pressure in the scavenge reservoir may be less than 2 Bar. It may be that the variable resistance valve is fully open throughout the third time period. This aspect of the method may result in rapid retraction of the hydraulic actuator, for example in response to sensing of an upcoming pot hole or bump in the road. The steps of switching the valves to the appropriate position for the third time period may be carried out by the control system of the suspension system in response to one or more inputs as described above. The third time period may take place before or after the first time period. The third time period may take place between the first and second time period.

The method may comprise, for a fourth time period, operating the pump to pressurise the variable accumulator to a higher pressure than the first and second accumulators, and then opening the valve associated with the variable accumulator to increase the pressure in the common path while the valves associated with the first and second accumulators are closed thereby causing the hydraulic actuator to extend. It may be that the variable resistance valve is fully open throughout the fourth time period. This aspect of the method may result in rapid extension of the hydraulic actuator, for example causing the body of the car to 'jump'. The hydraulic actuator may fully retract in less than 15 milliseconds, for example less than 10 milliseconds. The steps of switching the valves to the appropriate position for the fourth time period may be carried out by the control system of the suspension system in response to one or more inputs as described above. The fourth time period may take place before or after the first time period. The fourth time period may take place between the first and second time period.

During the first and/or second time period, the method may comprise fluid leaking from a chamber of the hydraulic actuator into a sealing region of the piston housing (as described above with reference to the apparatus). The method may comprise fluid flowing from the sealing region to the scavenge reservoir via one or more scavenge outlets located in the sealing region. It may be that the pressure in the sealing region thereby remains less than 5 Bar. The method may comprise periodically opening the valve associated with the scavenge reservoir and operating the pump to return fluid from the scavenger reservoir to the common path. Thus, methods in accordance with this aspect of the disclosure may reduce pressure experienced by the seals of the piston housing allow for the use of more flexible seals and reduced seal friction.

According to a sixth aspect of the disclosure there is provided an automotive vehicle comprising a suspension system according to any other aspect of the disclosure described herein.

It may be the automotive vehicle comprises a plurality of wheels connected to a chassis. It may be the vehicle comprises a plurality of said suspension systems or said suspension units, one associated with each wheel, for example mounted on each wheel assembly. Each wheel assembly may comprise a wheel. It may be that the automotive vehicle is a passenger vehicle, for example a car configured to seat no more than 10 passengers. Active suspension systems may find particular application in passenger vehicles in view of the need to provide good ride quality.

It will of course be appreciated that features described in relation to one aspect of the present disclosure may be incorporated into other aspects of the present disclosure. For example, the method of the disclosure may incorporate any of the features described with reference to the apparatus of the disclosure and vice versa.

DESCRIPTION OF THE DRAWINGS

Embodiments of the present disclosure will now be described by way of example only with reference to the accompanying schematic drawings of which:

FIG. 14(*b*) shows the interior volume of the flow galleries within the pump manifold of the pump and control unit of the suspension unit of FIG. 13.

DETAILED DESCRIPTION

Figure 1:
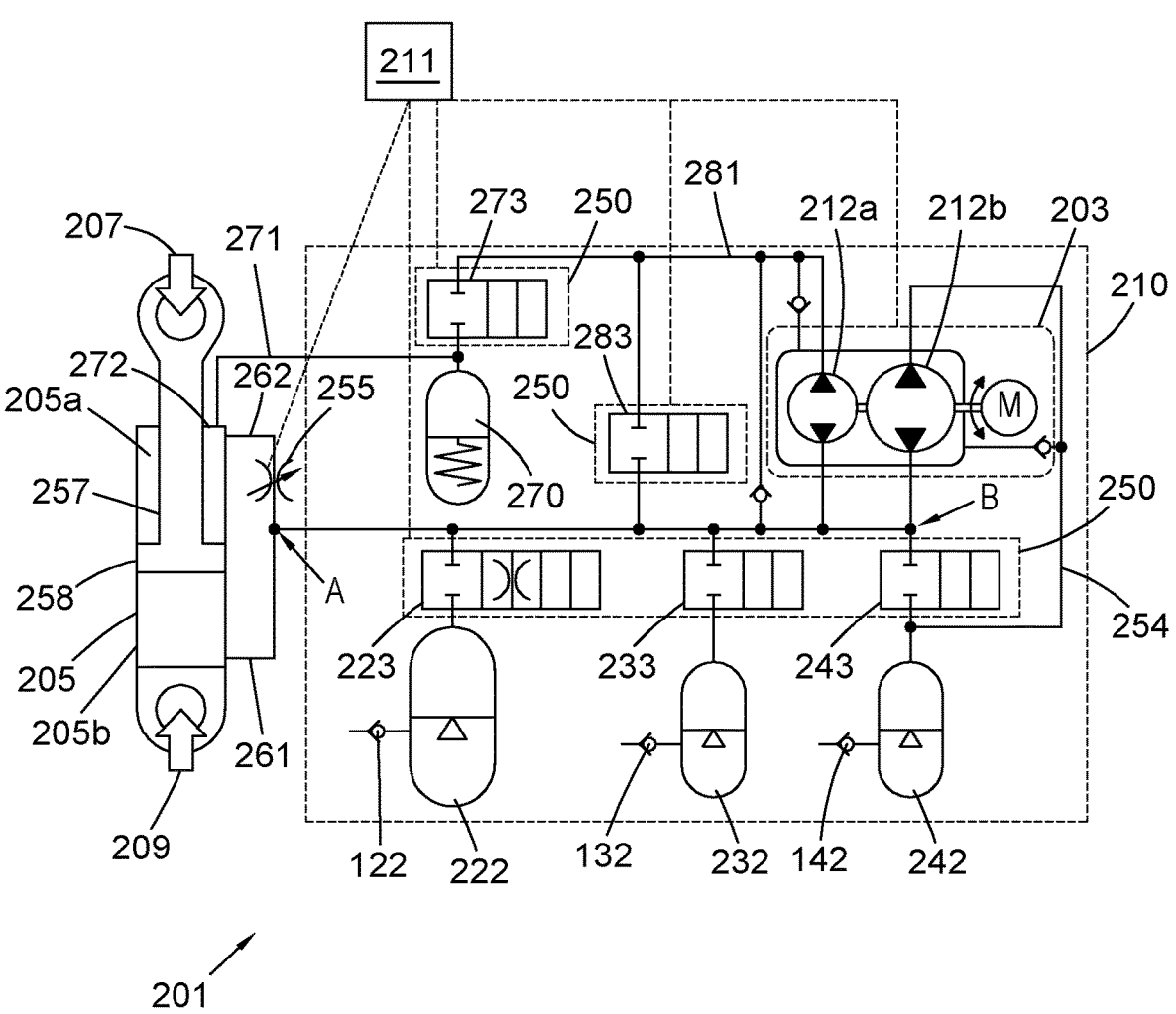
FIG. 1 shows a hydraulic schematic representation of an active suspension system according to a first embodiment of the present disclosure.

FIG. 1 shows a schematic representation of an active suspension system according to a first example embodiment. The active suspension system 201 comprises a hydraulic circuit 210 and a hydraulic actuator 205 connected via a primary flow gallery AB (i.e. the flow gallery which defines a flow path between reference letter A, and reference letter B in FIG. 1). All the fluid output from hydraulic circuit 210 to hydraulic actuator 205 passes via the common point A. Connected to the primary flow gallery AB are a higher volume accumulator 222, a lower volume accumulator 232 and a variable volume accumulator 242. A pump 203 is also connected to the primary flow gallery AB. It will be understood that, as used here, 'connected' means that there is a potential path for fluid to flow between the connected elements. It will be appreciated that whether fluid flows along said potential path will depend on the position of any valves (e.g. open or closed) along said path. Thus, fluid may flow from each of the higher volume accumulator 222, lower volume accumulator 232, variable volume accumulator 242 and pump 203 to the primary flow gallery AB. Each of the accumulators (222, 232, 242) is in fluid communication with a compressed air source (not shown) via check valves 122, 132 and 142 respectively.

A first independent switch valve 223 is located on the flow path between the higher volume accumulator 222 and the primary flow gallery AB. The switch valve 223 is a variable resistance valve that can occupy a fully open position, a fully closed position, and a number of intermediate positions. A second independent switch valve 233 is located on the flow path between the lower volume accumulator 232 and the primary flow gallery AB and has an open position and a closed position. A third switch valve 243 is located on the flow path between the variable volume accumulator 242 and the primary flow gallery AB. The higher volume accumulator 222 is connected to the primary flow gallery AB at a point located between point A and the point at which lower volume accumulator 232 connects to the flow gallery AB. The variable accumulator 242 is connected to the primary flow gallery AB at point B, on the other side of the point at which lower volume accumulator 232 connects to the flow gallery AB.

In the present embodiment, pump 203 comprises a low displacement stage 212a and a high displacement stage 212b. In other embodiments these two stages may be provided by separate pumps or using a variable displacement pump. The variable accumulator 242 is directly connected to the high displacement stage 212b with a direct flow path 254. The other side of the high displacement stage 212a is connected to the primary flow gallery AB at point B (i.e. the same point as the variable pressure accumulator). One side of the low displacement stage 212a is directly connected to the primary flow gallery AB between point B and the point at which lower volume accumulator 232 connects to the flow gallery AB. The other side of the low displacement stage 212a is connected to a scavenge accumulator 270 via a scavenge flow gallery 281.

A fourth switch valve 273 is located on the scavenge flow gallery. A scavenge flow gallery 271 connects a scavenger inlet 272 of hydraulic actuator 205 and to a point on the flow path between the fourth switch valve 273 and the scavenge reservoir 270. A fifth switch valve 283 is located on a return flow gallery 282 which extends between primary flow gallery AB (at a point between the connection with the higher volume accumulator 222 and the lower volume accumulator 232) and the scavenger flow gallery 281 (between the pump 203 and the fourth valve 273).

Figure 2:
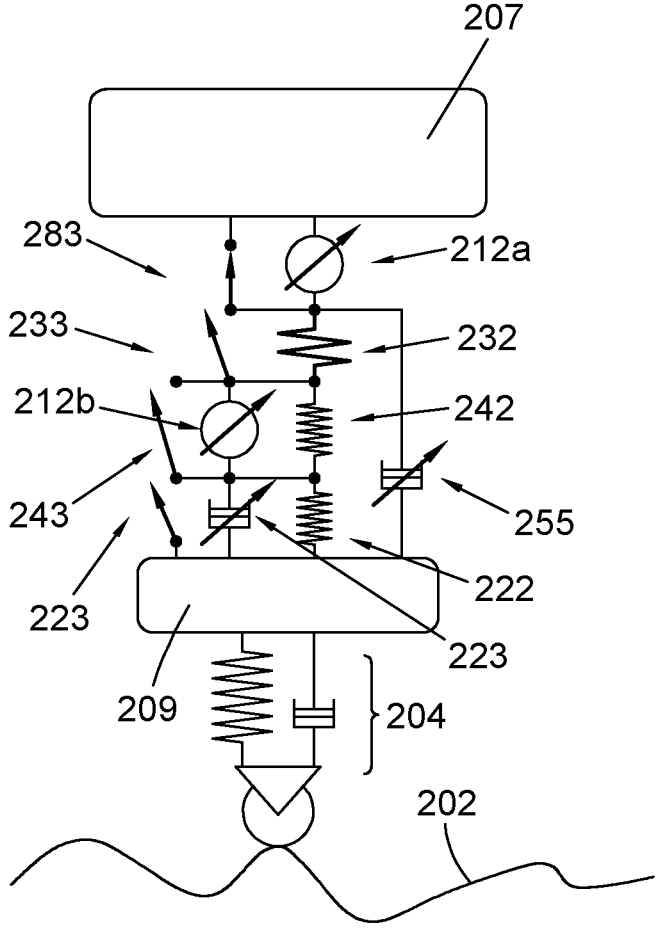
FIG. 2 shows a mechanical schematic view of a quarter car model of the active suspension system of FIG. 1.

The hydraulic actuator 205 is connected at one end (the upper end in FIG. 1) to a car body 207 (see FIG. 2) and at the opposite end to a wheel assembly 209 (see FIG. 2). The hydraulic actuator 205 comprises a rod 257 connected at its distal end the car body and having a piston head 258 at its other end. The piston head 258 is received in a cylinder (see FIGS. 8 and 9) of the actuator 205 thereby dividing the interior of the cylinder into two chambers; upper chamber 205a and lower chamber 205b. The effective surface area of the piston head 258 that borders the lower chamber 205b is larger than the effective surface area of the piston head 258 that borders the upper chamber 205a, as a result of the presence of the rod 257 on the side of the upper chamber 205a reducing the area exposed to the fluid pressure in the upper chamber 205a.

A first flow gallery 262 connects point A on the primary flow gallery AB to the upper chamber 205a. A second flow gallery 261 connects point A to the lower chamber 205b. A variable resistance valve 255 is located on the first flow gallery between point A and the upper chamber 205a.

FIG. 2 shows a mechanical schematic view of a quarter-car model of the active suspension system 201 of the first embodiment of the disclosure, which is depicted using a hydraulic schematic diagram in FIG. 1.

The quarter car model shows the accumulators (222, 232, 242) represented as springs in series with the low displacement stage 212a between the mass of the car body 207 and the wheel assembly 209 located on the ground 202. The tyre 204 of the wheel assembly 209 is represented as both a spring and a damper in FIG. 2. A damper and switch corresponding to the third switch valve 223 and are shown in parallel with the spring representing the higher volume accumulator 222. The high displacement stage 212*b* is shown in parallel with the switch representing valve 243 and the spring representing the variable accumulator 242. The switch representing valve 233 is in parallel with the spring representing the lower volume accumulator 232. The switch representing return valve 283 is shown in parallel with low displacement stage 212*a*. Variable resistance valve 255 is shown in parallel with the springs representing all three accumulators 232, 242, 222.

As is apparent from FIGS. 1 and 2, when the valve associated with an accumulator is shut, the gas in that accumulator does not experience any change in pressure in the common flow path AB and, in mechanical terms, this is equivalent to locking out the corresponding spring in the diagram of FIG. 2. Thus, by altering the position of the valves of the system of FIGS. 1 and 2, the stiffness and damping properties of the hydraulic actuator 205 can be varied. Suspension systems in accordance with the present embodiment may therefore provide a suspension having different properties at different times.

Figure 11:
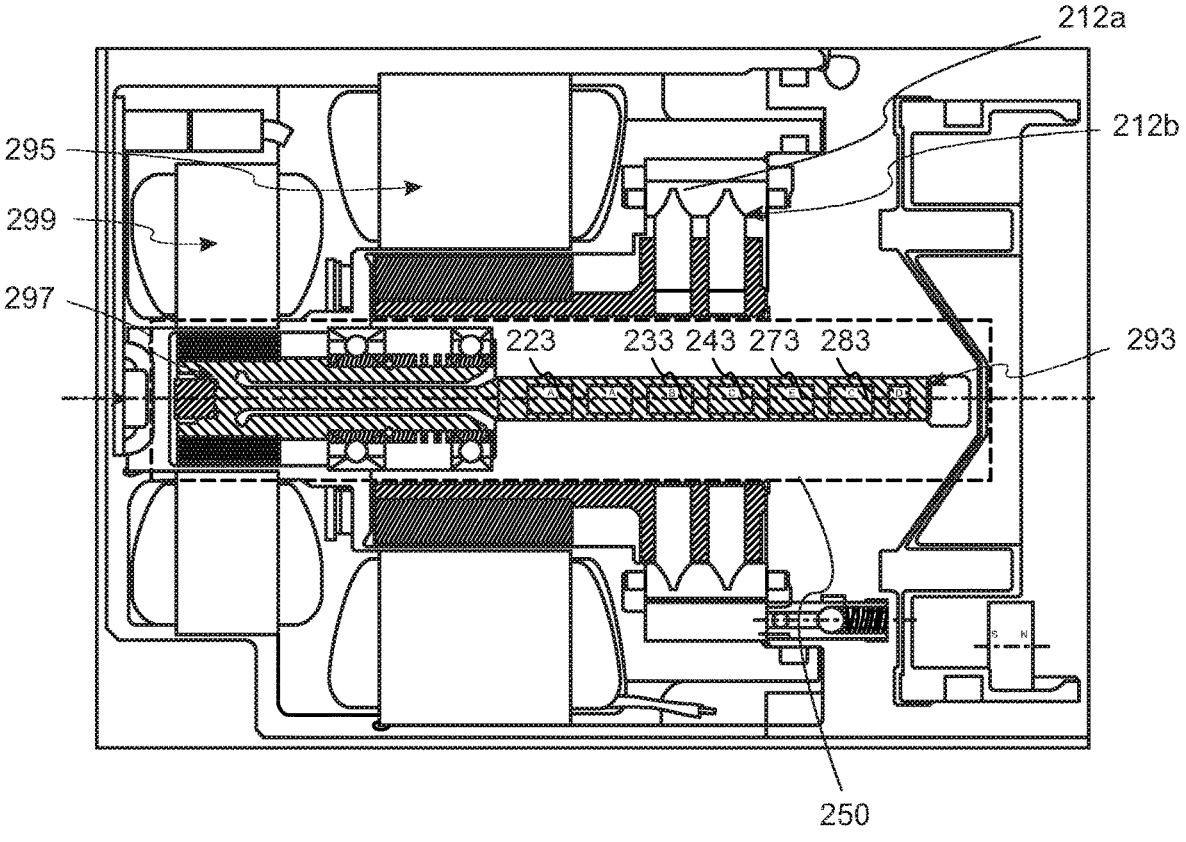
FIG. 11 shows a close up of part of the unit of FIG. 10.

In the present embodiment, the switch valves 223, 233, 243, 273 and 283 form part of a single main valve 250 which is a rotary direct drive servo valve. In other embodiments, separate valves may be used. The main valve 250 has a spool (not shown in FIG. 1) that is driven directly by a motor (not shown in FIG. 1). An example of such a valve is shown in FIG. 11. Use of a single valve to control the flow of fluid to various different components in the system may allow for a more compact and/or lighter active suspension system. It may also result in a more responsive system.

The higher volume accumulator 222 contains a larger quantity of gas (a higher volume of compressible gas at a reference pressure) than the lower volume accumulator 232. The lower volume accumulator 232 contains a smaller quantity of gas (a lower volume of compressible gas at the reference pressure) than the higher volume accumulator 222. The quantity of gas (the volume of gas at the reference pressure) contained in the variable accumulator 242 can be varied.

The low displacement stage 212*a* provides a lower flow rate than the high displacement stage 212*b*. For example in some embodiments, the low and high displacement stages may provide flow rates in the region of 0.5 and 5 litres per minute respectively.

A control system 211 controls the main valve 250, variable resistance valve 255 and variable displacement pump 203. The control system 211 is of a conventional type, and is capable of receiving user and/or sensor input, the sensor input including accelerometers and speed sensors. The control system can output commands to the main valve 250, variable resistance valve 255 and variable displacement pump 203 such that the length, stiffness, damping, and force exerted by the hydraulic actuator 205 can be controlled.

Operation of the active suspension system 201 of FIG. 1 and FIG. 2 will now be described in with reference to a number of different configurations or modes of operation.

Figure 3:
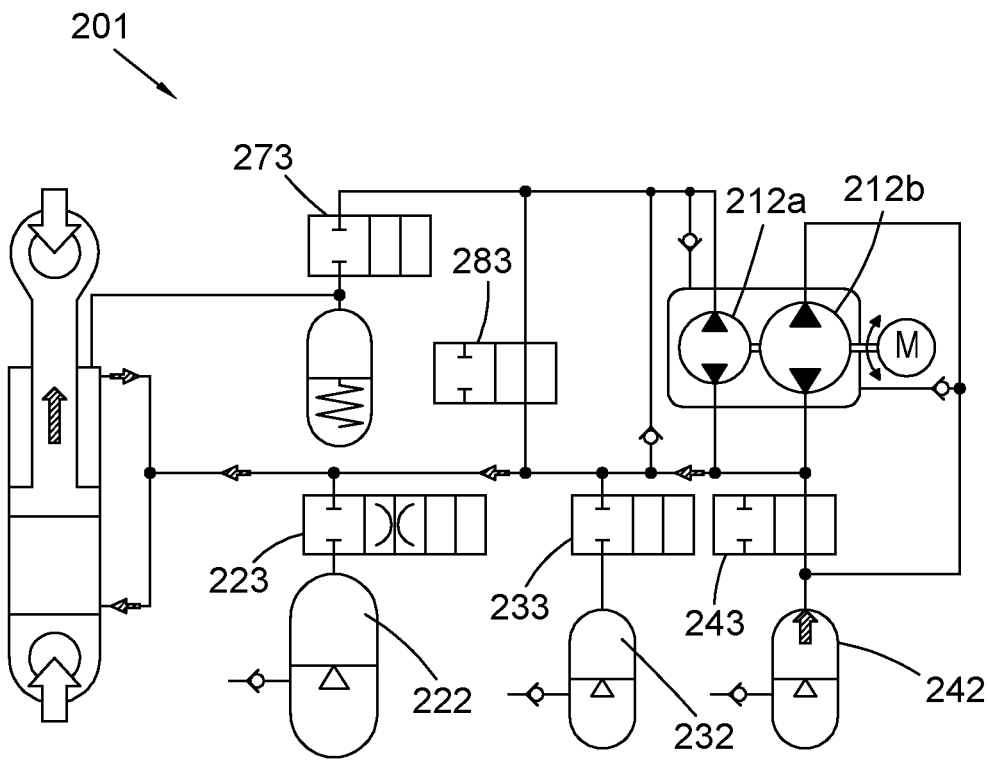
FIG. 3 shows the flow path around the active suspension system of FIG. 1 when the system is in the "fast extend" mode of operation.

FIG. 3 shows the flow path around the active suspension system of FIG. 1 when the active suspension system of the first embodiment of the disclosure is used in a "fast extend" mode of operation. Before switching to the "fast extend" mode, the variable accumulator 242 is charged with pressurised fluid by the high displacement stage 212*b*. In the "fast extend" mode the switch valves (223, 233, 273) of the higher volume accumulator 222, lower volume accumulator 232 and scavenge reservoir 270 are all fully closed. Both the high displacement stage 212*a* and the low displacement stage 212*a* of pump are stopped (in other embodiments they may be recirculating fluid with the primary flow gallery and variable accumulator 242). Before switching to "fast extend" the weight of the car body 207 is supported by the reaction forces on the piston rod 256. In this initial equilibrium state, the pressure in the chamber equals the pressure along the primary flow path AB. When "fast extend" is initiated, the switch valve 243 associated with variable accumulator 242 is switched to its fully open position causing a pressure change in flow gallery AB that is transmitted to hydraulic actuator 205. The pressure change is initially the same in both the upper chamber 205*a*, and the lower chamber 205*b*. However, the effective surface area of the piston head 258 in contact with the fluid within the lower chamber 205*b* is larger than the effective surface area of the piston head 258 that is in contact with the fluid within the upper chamber 205*a*. This results in their being a net upward force on the piston head 258. As the piston rises, the decreasing volume of the upper chamber 205*a* forces fluid to move from the upper chamber to the lower chamber 205*b* via flow paths 262, thereby causing the hydraulic actuator 205 to rapidly extend.

Figure 4:
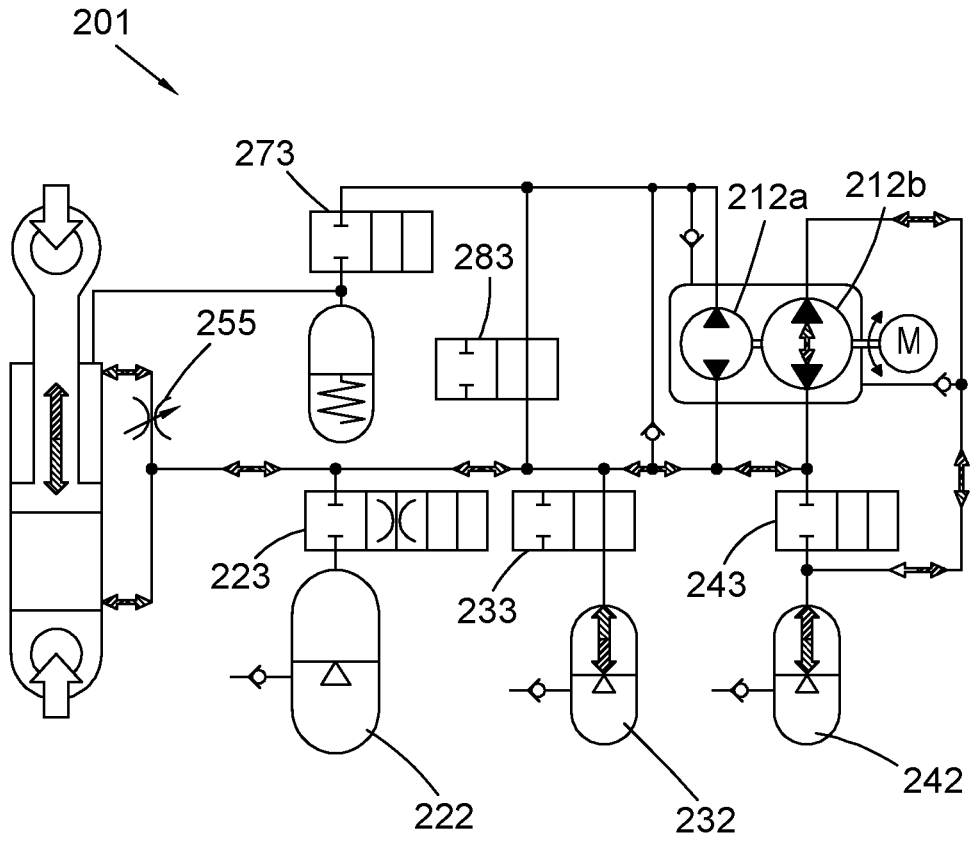
FIG. 4 shows the flow path around the active suspension system of FIG. 1 when the system is in the "high stiffness" mode of operation.

FIG. 4 shows the flow path around the active suspension system when the active suspension system of the first embodiment of the disclosure is used in a "high stiffness" mode of operation.

In the "high stiffness" mode the switch valves (223, 243, 273) of the higher volume accumulator 222, variable accumulator 242 and scavenge reservoir 270 are all fully closed. The return valve 283 is fully open so that fluid recirculates between low displacement stage 212*a* and the primary flow path AB. The switch valve 233 associated with the lower volume accumulator 232 is fully open. The switch valve 243 is closed such that fluid from variable accumulator 242 flows to or from the primary flow path AB via the high displacement stage 212*b*. Variable resistance valve 255 is partially open. The total pressure at point A is greater than 10 MPa (100 Bar) while the system is in "high stiffness" mode, for example the spring rate may vary between 30 N/mm and 90 N/mm in this mode.

In "high stiffness" mode, only the gas in the lower volume accumulator 232 is exposed to changes in pressure in the primary flow path AB, the other accumulators being isolated by the relevant switch valve. As only a relatively small quantity of gas can be compressed by the action of the incompressible fluid in the hydraulic system, the hydraulic system is relatively stiff which translates to a relatively high stiffness of the actuator 205. The stiffness can be further increased by driving the high displacement stage 212*a*. Driving the high displacement stage 212*a* can also be used to raise or lower the mean ride height of car body by changing the pressure in the primary flow path AB. When the pressure in primary flow path AB is increased (for example by driving the high displacement stage 212*a*) the resulting increase in pressure in both the upper chamber 205*a*, and the lower chamber 205*b* results in movement of the piston head 258 and thereby the actuator as described above. Additional resistance provided by valve 255 as fluid moves between the upper and lower chamber produces a damping effect on the movement of the piston. This damping effect can be varied by changing the diameter of the variable orifice. Thus, in the "high stiffness" mode systems in accordance with the present embodiment provide active suspension with high stiffness, variable damping (by varying the resistance provided by valve 255) and ride height control.

The high stiffness mode of operation may be selected when if a high acceleration (i.e. greater than 2-4 $m/s^2$ of roll)

is predicated by the control system, for example in response to a movement of the steering wheel by the driver.

Figure 5:
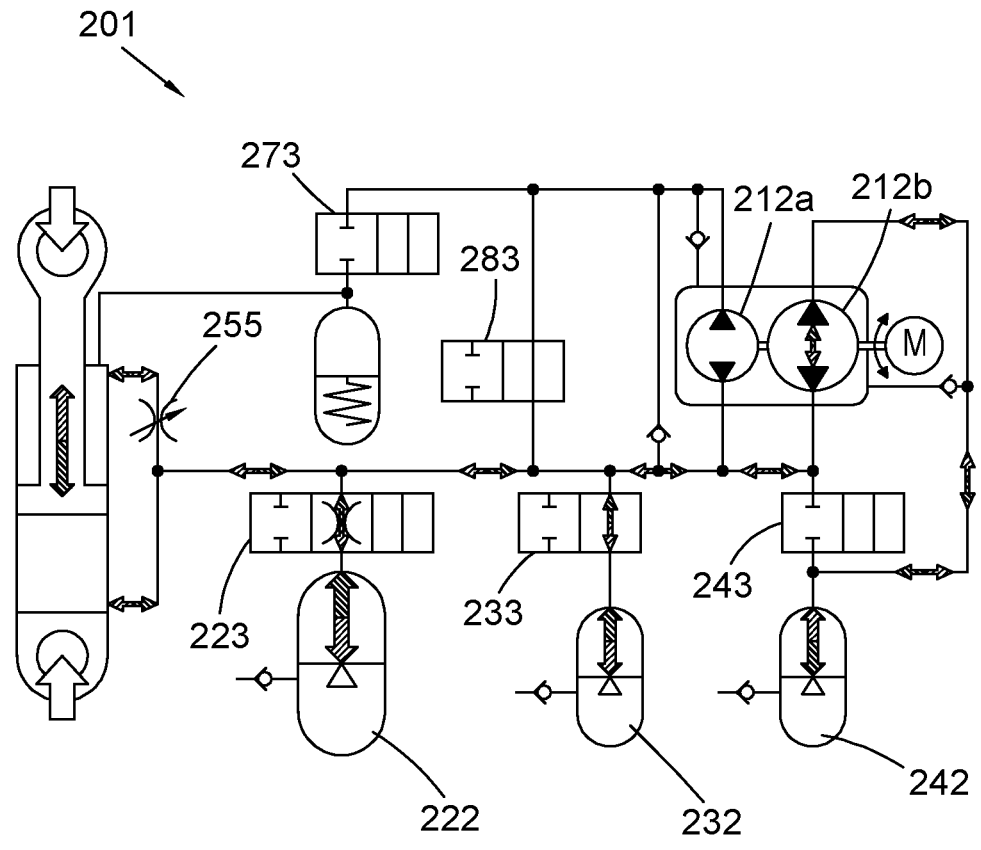
FIG. 5 shows the flow path around the active suspension system of FIG. 1 when the system is in the "low stiffness" mode of operation.

FIG. 5 shows the flow path around the active suspension system when the active suspension system is in a "low stiffness" mode of operation.

In the "low stiffness" mode the switch valves (243, 273) of the variable accumulator 242 and scavenge reservoir 270 are all fully closed. The return valve 283 is fully open so that fluid recirculates between low displacement stage 212a and the primary flow path AB. The switch valve 233 associated with the lower volume accumulator 232 is fully open. The switch valve 223 associated with the higher volume accumulator 222 is partially open. The switch valve 243 is closed such that fluid from variable accumulator 242 flows to or from the primary flow path AB via the high displacement stage 212b. Variable resistance valve 255 is partially open. The total pressure at point A is greater than 7 MPa (70 Bar) while the system is in "low stiffness" mode. For example, the stiffness in this mode may vary between 5 N/mm and 50 N/mm.

In "low stiffness" mode, the connection of both lower volume accumulator 232 and higher volume accumulator 222 to the primary flow path AB means a larger quantity of gas is exposed to changes in pressure in the flow path AB than in "high stiffness" mode. As more gas can be compressed by the action of the incompressible fluid in the hydraulic system, the hydraulic system is less stiff than when in "high stiffness" mode which translates to a relatively low stiffness of the actuator. When the pressure in primary flow path AB is increased (for example by driving the high displacement stage 212a) from a steady state the pressure differential between the weight of the car on the piston rod 257, and the increase of pressure along the primary flow path AB, results in fluid flowing into the hydraulic actuator 205. The same change in pressure is experienced in both the upper chamber 205a, and the lower chamber 205b and again, the difference in the effective surface area on different sides of the piston head 258 results in movement of the actuator as described above. Similarly, when the pressure in primary flow path AB is decreased (e.g. by running the high displacement pump 212a such that is reduces the pressure of fluid along the common flow path AB) the reduction in pressure in each of the upper and lower chambers 205a, 205b results in movement of the actuator in the other direction. Again, additional resistance is provided by valve 255 as fluid moves between the upper and lower chamber which produces a damping effect on the movement of the piston. This damping effect can be varied by changing the diameter of the variable orifice. Thus, in the "low stiffness" mode systems in accordance with the present embodiment provide active suspension with lower stiffness, variable damping (by varying the resistance provided by valve 255 and valve 223) and ride height control.

The "low stiffness" mode is a mode for general driving, at relatively low levels of acceleration. The stiffness in the system is relatively low (compared to the high stiffness set-up).

Figure 6:
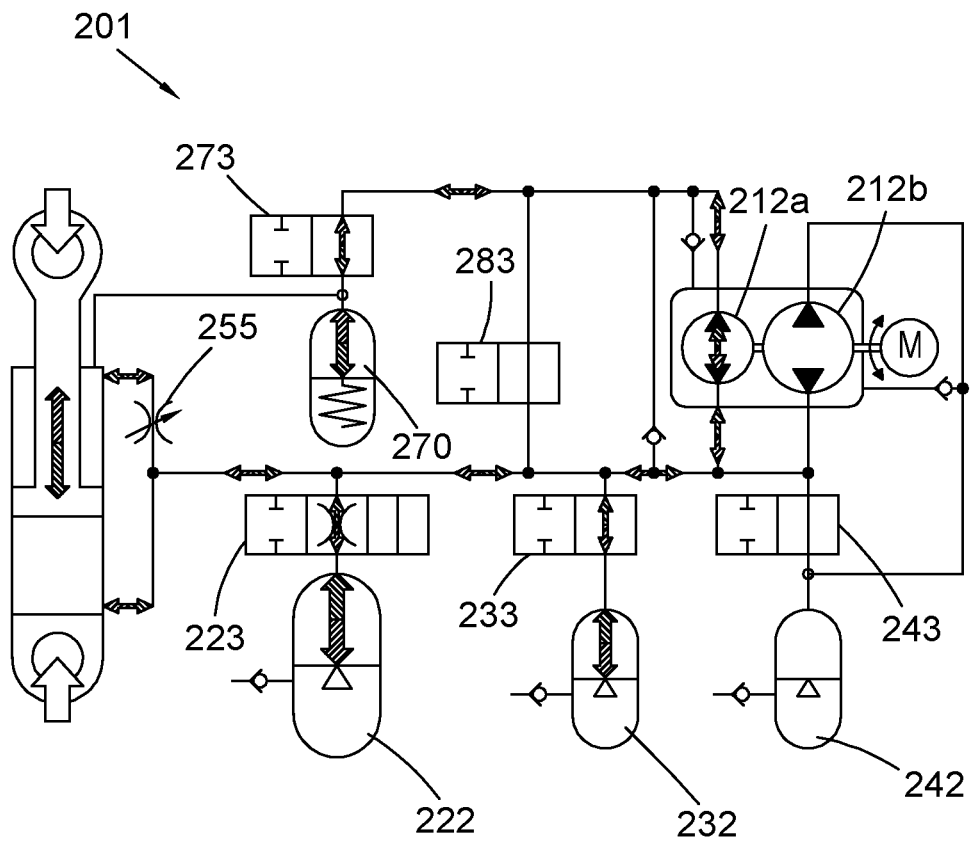
FIG. 6 shows the flow path around the active suspension system of FIG. 1 when the system is in the "hydraulic balancing" mode of operation.

FIG. 6 shows the flow in the active suspension system when the active suspension system of the first embodiment of the disclosure is used in "a hydraulic balancing" mode of operation in which fluid collected in scavenge reservoir 270 is returned to the hydraulic circuit 210.

In the "hydraulic balancing" mode the switch valves (243, 273) of the variable accumulator 242 and scavenge reservoir 270 are all fully open. The return valve 283 is fully open so that fluid recirculates between low displacement stage 212a and the primary flow path AB. The switch valve 233 associated with the lower volume accumulator 232 and the switch valve 243 associated with the variable accumulator are fully open. The switch valve 223 associated with the higher volume accumulator 222 is partially open. The switch valve 243 is open such that fluid from the high displacement stage 212b recirculates via point B and the variable displacement reservoir 242. Variable resistance valve 255 is partially open. The total pressure at point A is similar to that of the low stiffness mode, and the pressure, at point A is greater than 7 MPa (70 Bar) in this mode. The stiffness of the hydraulic actuator 205 is similar to that of the "low stiffness" mode, for example the stiffness may vary between 5 N/mm and 50 N/mm.

In "hydraulic balancing" mode, the quantity of gas exposed to the action of the hydraulic fluid is the same as in "low stiffness" mode, which results in a similar stiffness and changes in pressure in the primary flow path AB result in movement of the actuator 205 in a similar manner. In contrast to the "low stiffness" mode, in the "hydraulic balancing" mode, the low displacement stage 212a is driven to return fluid from the scavenge reservoir 270 to the primary flow path AB. Thus, in the "hydraulic balancing" mode systems the performance of the system is similar but this mode allows fluid that has leaked from the accumulator to be returned to the hydraulic circuit via the scavenger system. In the hydraulic balance mode, the length of the actuator 205 can be adjusted (e.g. the low displacement stage 212a being driven to return fluid from the scavenge reservoir 270 to the primary flow path AB can be used to raise the hydraulic actuator). When switched out of the "hydraulic balancing" mode no additional, or ongoing, supply of energy is required to maintain the changed actuator length.

Figure 7:
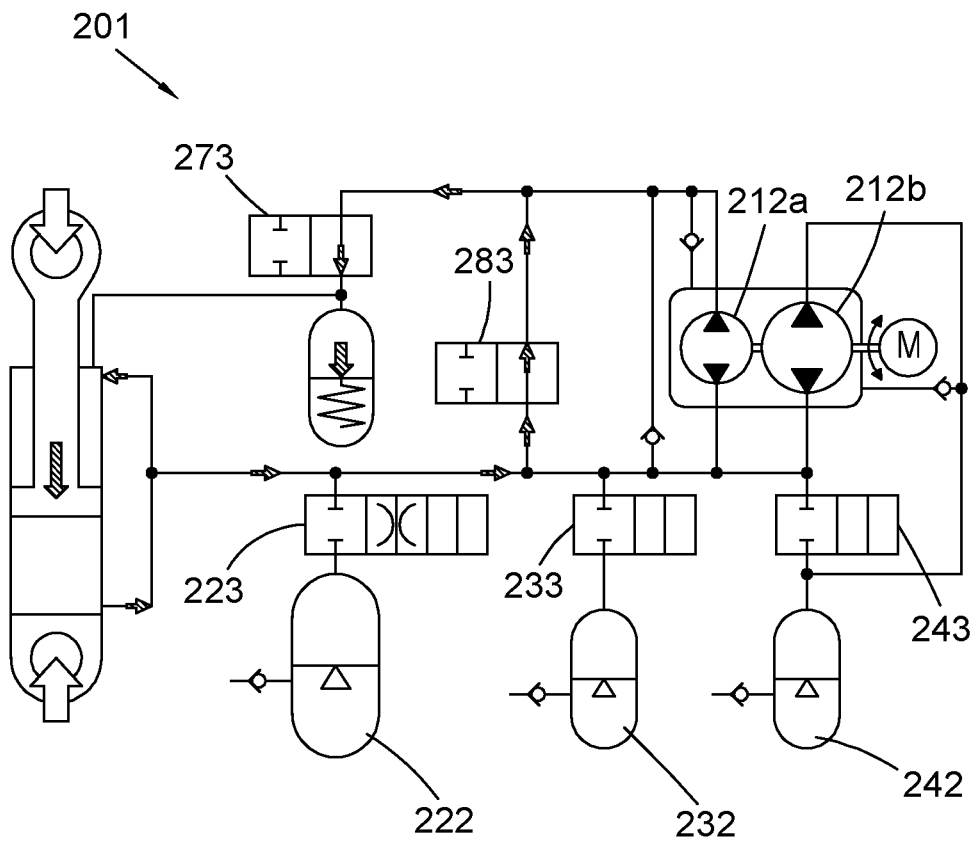
FIG. 7 shows the flow path around the active suspension system of FIG. 1 when the system is in the "fast retract" mode of operation.

FIG. 7 shows the flow path takes around the active suspension system when the active suspension system is used in "a fast retract" mode of operation, for example in response to a pot-hole or bump in the road.

In "fast retract" mode the switch valves (223, 233, 243) of the higher volume accumulator 222, lower volume accumulator 232 and variable accumulator 242 are all switched to their closed positions. Both the high displacement stage 212a and the low displacement stage 212a are stopped (although in other embodiments they may be recirculating fluid via the primary flow path AB). When initiated, the "fast retract" return valve 283 and switch valve 273 are fully opened so that pressure in the primary flow gallery AB drops rapidly as fluid flows to the low pressure scavenge reservoir 271. Given the car body 207 acting to compress the actuator 205, and the high pressure of the fluid in the hydraulic actuator 205 in the steady state, this results in the rapid expulsion of fluid from the hydraulic actuator 205, the relatively low volume of fluid in the hydraulic circuit 210 means the expulsion of fluid from the hydraulic actuator 205 is functionally instantaneous. The loss of pressure in the actuator 205 allows the car body 207, and the wheel assembly 209 moving towards each other. The rapid removal of the downward force from the hydraulic actuator on a tyre (not shown) mounted on the wheel assembly 209, causes that type to rapidly expand, and push off from the ground. This results in the wheel assembly 209 accelerating towards the hydraulic actuator (and thus the car body 207) at accelerations greater than gravity, for example of around 7 g. Meanwhile, the car body 207 moves towards the hydraulic actuator (and thus the ground 202) under the action of gravity (i.e. with an acceleration of g). Thus, the net effect of these differences in acceleration means that when the fast retract mode is activated, the wheel mounting point 209 will retract rapidly towards the car body. Thus, the hydraulic actuator 205, in the "fast retract" mode, can be used to rapidly raise the wheel assembly 209 off the ground 202, to avoid potholes and the like.

Figure 8:
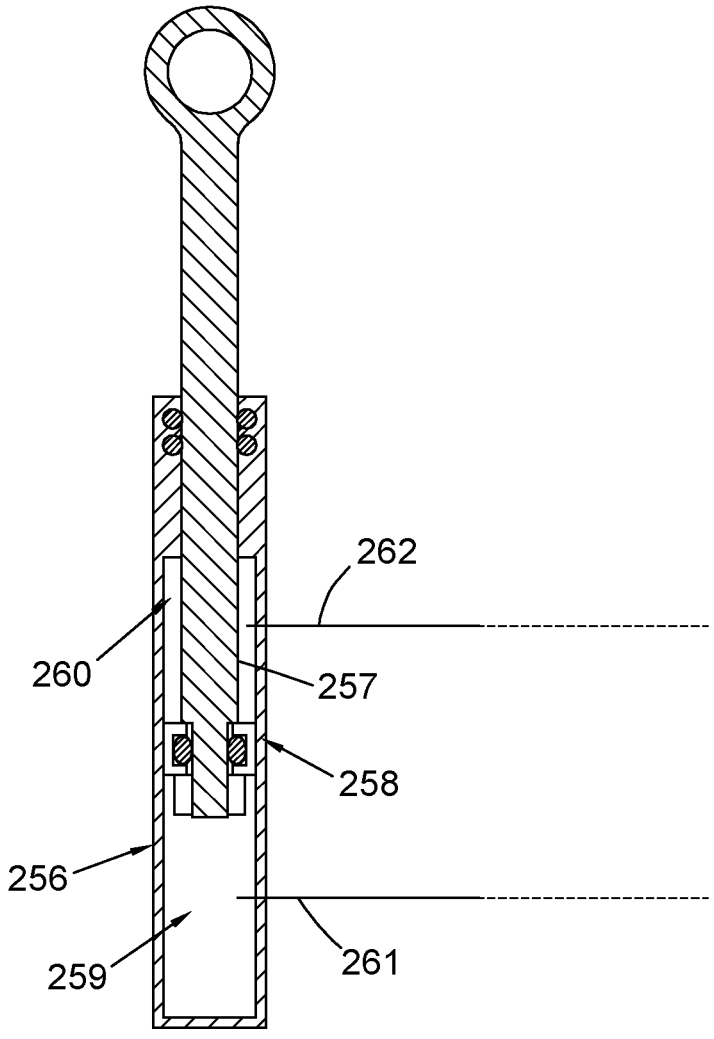
FIG. 8 shows a hydraulic actuator suitable for use in the system of FIG. 1.

FIG. 8 shows an example hydraulic actuator suitable for use in the first embodiment of the disclosure in more detail.

Within a sleeve 256 of the hydraulic actuator 205 is a rod 257. At the upper end (in FIG. 8) of the rod 257 is the first connection point for connecting to the car body 207. At the lower end of the rod 257 is a piston head 258. The second connection point for supporting the wheel assembly 209 is at the lower end (in FIG. 8) of the sleeve 256 of the hydraulic actuator 205.

Figure 9:
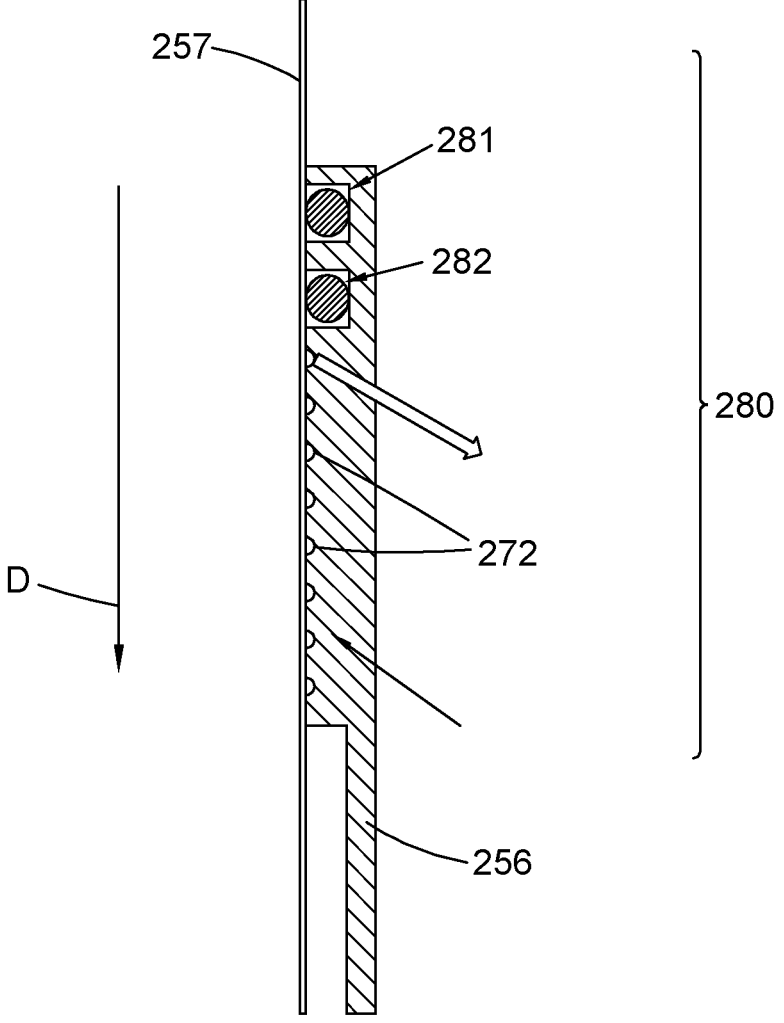
FIG. 9 shows a close up view of part of the actuator of FIG. 8.

FIG. 9 shows a close up view of the upper end region of the sleeve of the actuator of FIG. 8. Only the outermost surface of the rod 257 is shown in this figure. At the end of the sleeve 256 is sealing region 280 extending between the distal end of the upper chamber 260 and the distal end of sleeve 256. Two seals 281 are located adjacent the distal end of the sealing region 280, spaced apart along the longitudinal axis of the rod 257 and extending circumferentially around the inner surface of the sleeve 256. A number of scavenger inlets 272 are formed in the interior surface of the sleeve 256 in the sealing region 280 and are connected to scavenger flow gallery 271.

In use, a quantity of fluid may leak from the upper chamber 260 into the sealing region, and then exit the region via scavenger inlets 272 to scavenger flow gallery 271. As a result, the pressure of any fluid in the sealing region is reduced and so the pressure that the seals 281 must withstand is also reduced (for example, in some embodiments, seals 281, 282 experienced a force of no more than 30 N during normal operation). It follows that the fit between the seals 281 and 282 is not as tight, and the friction forces experienced by the rod 257 are correspondingly reduced, in comparison to a system without scavenger inlets, and that the power required to overcome said friction is likewise reduced. Thus, suspension systems including a sealing region and scavenger outlets in accordance with the present embodiment may be more efficient than comparable prior art suspension systems. Use of a sealing region including the scavenger inlets of the present embodiments may find particular application in suspensions systems including a pump as described herein, which may be used to recirculate the fluid that passes through the scavenger region thereby maintaining and conserving the supply of hydraulic fluid within the hydraulic circuit.

Figure 10:
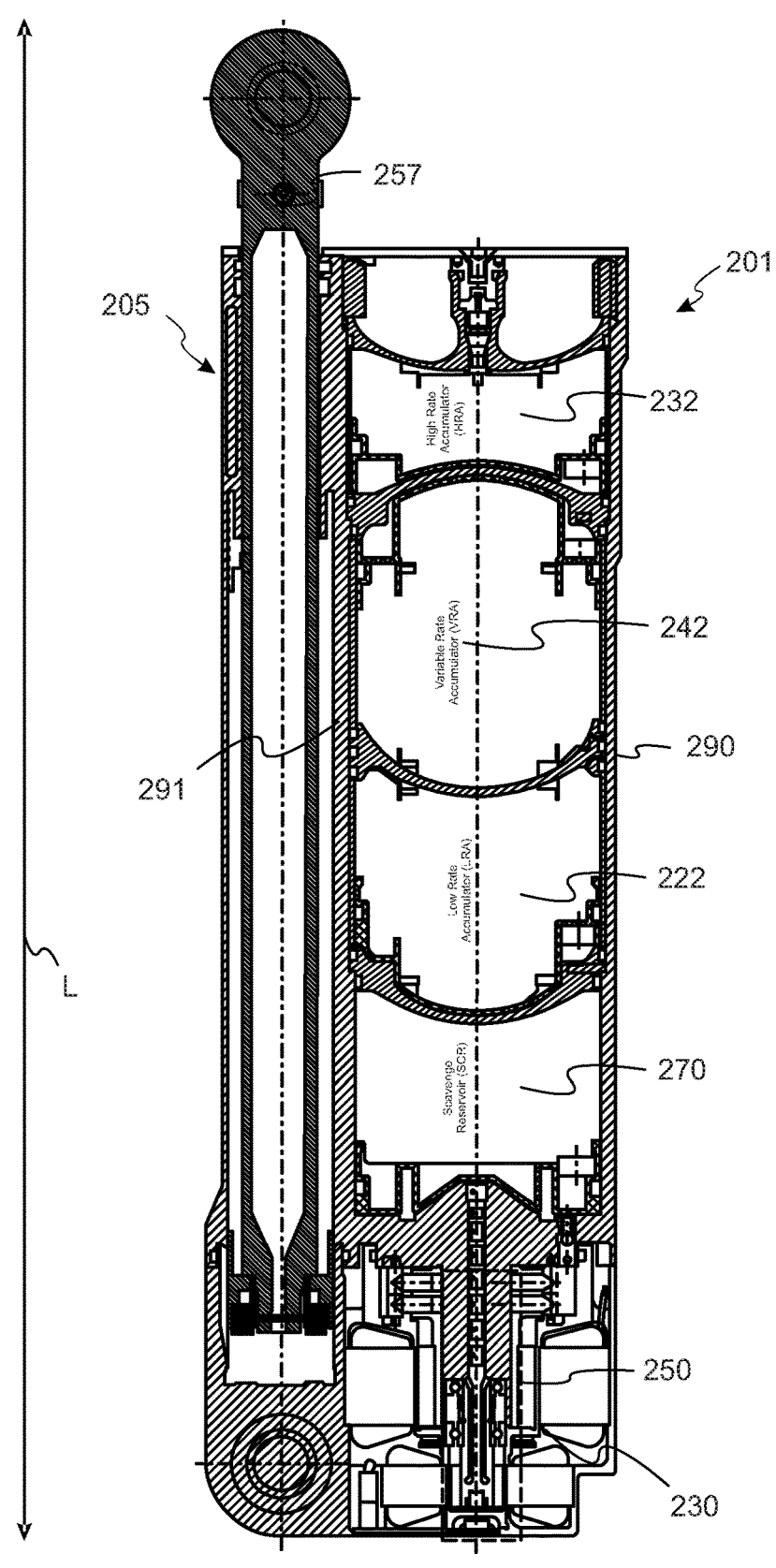
FIG. 10 shows a cross-sectional view of an example active suspension unit incorporating the system of FIG. 1.

FIG. 10 shows a cross-sectional view of an example active suspension unit, for example a unit suitable for use as the system of FIG. 1. The hydraulic circuit 210 is contained with a casing 290 of the unit. The rod 257 is located partially within the casing 290 adjacent to and extending parallel with the left-hand side of the casing 290 of the unit in FIG. 10. Arranged in a row to the right of the rod 257, are (in order starting at the end of the casing 290 from which the rod protrudes and working inward) the lower volume accumulator 232, the variable accumulator 242, the higher volume accumulator 222 and the scavenge reservoir 270. The lower volume accumulator 232 is adjacent the end of the casing 290, the other accumulators/reservoirs are side by side along the length of the rod, with the scavenge reservoir 270 close to the innermost end of the rod 257. The sleeve 256 forms a wall 291 that defines in part each of the accumulators (222, 232, 242) and scavenge reservoir 270. The variable displacement pump 230 is located adjacent the scavenge reservoir 270. The main valve 250 is concentrically located within the pump 230.

Arranging the elements of the active suspension system in accordance with the embodiment of FIG. 10 may provide a particularly compact and/or lightweight active suspension system. For example, in some embodiments the unit may have a length of 30 cm while providing a 15 cm of travel on the rod when fully extended. Additionally or alternatively, provision of such a compact unit may facilitate use of the active suspension system within the space constraints of the vehicle and/or result in shorter flow paths for the hydraulic fluid thereby reducing pressure losses and increasing efficiency.

FIG. 11 shows a close up of the pump 230 and the main valve 250 which is mounted within and concentric to the pump 230. The main valve 250 has a main spool 293 having a plurality of flat lands spaced apart along the length of the spool, each land corresponding to one of the valve switches (223, 233, 243, 273, 283). The pump 230 comprises a motor rotor 297 mounted within and for rotation relative to a motor stator 299. The pump is a radial piston pump comprising a first row of pistons received in piston chambers formed within the motor rotor 297 and a second row of pistons, spaced apart along the axis of rotation of the pump from the first row of pistons. The first set of pistons are part of the first pump assembly 212*a* and the second row of pistons are part of the second pump assembly 212*b*. In use, main valve 250 controls which of the first and or second rows of pistons (or pump assemblies) are in use and thereby varies the flow rate of fluid output from the pump.

Thus, having the main valve and the high displacement and low displacement pump arranged in this way allows for the main valve to be provided with fluid for its relatively large number of switching states, in a compact arrangement. This helps the active suspension unit remain compact. Additionally, use of a spool valve, particularly a direct drive valve such as shown in FIG. 11, allows for rapid switching between a very large number of states. This allows active suspension systems in accordance with the present embodiments to respond more quickly to road and/or driving conditions than prior art suspension systems and/or to provide additional modes of operation thereby improving the efficiency of the valve by providing a system that has different characteristics in different points in time.

Figure 12:
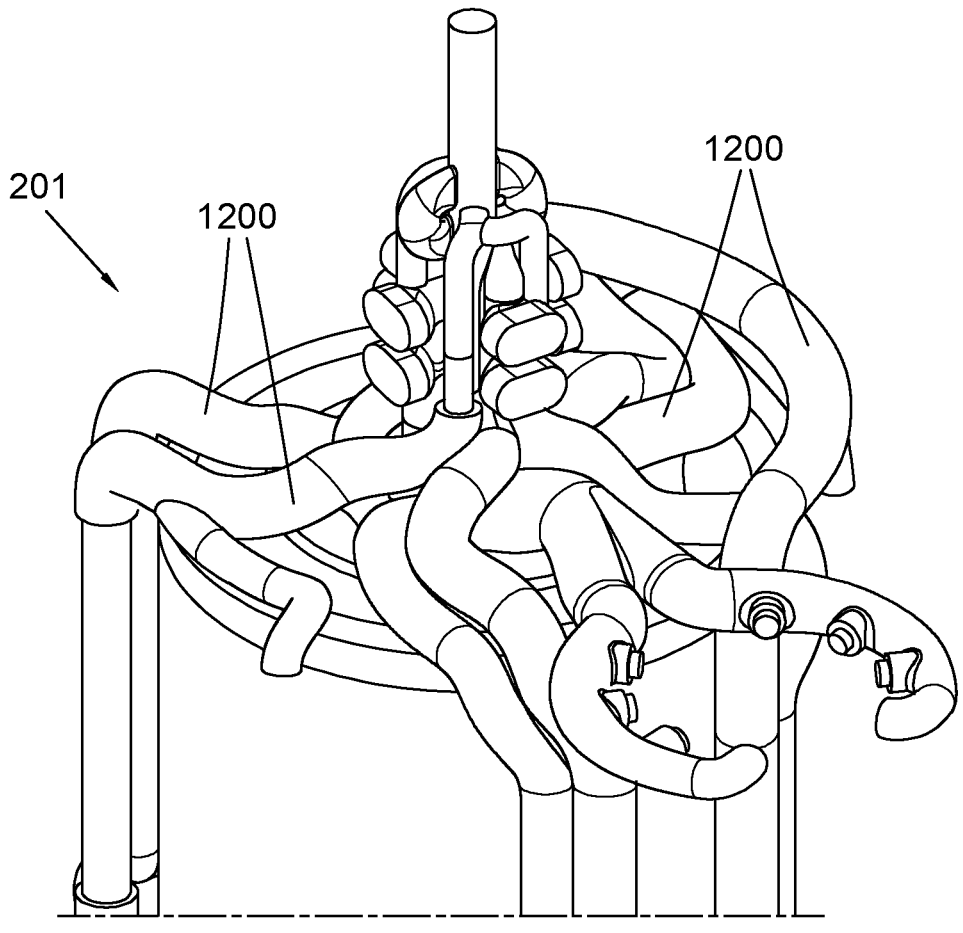
FIG. 12 shows the flow galleries of part of the unit of FIG. 10

FIG. 12 shows a plurality of flow galleries 1200 of active suspension system 201 as formed within casing 290 which connect the various components described above. The flow galleries 1200 are curvilinear in shape and can be manufactured using additive manufacturing techniques. The curvilinear nature of the flow galleries allows for a yet more compact active suspension unit.

Figure 13:
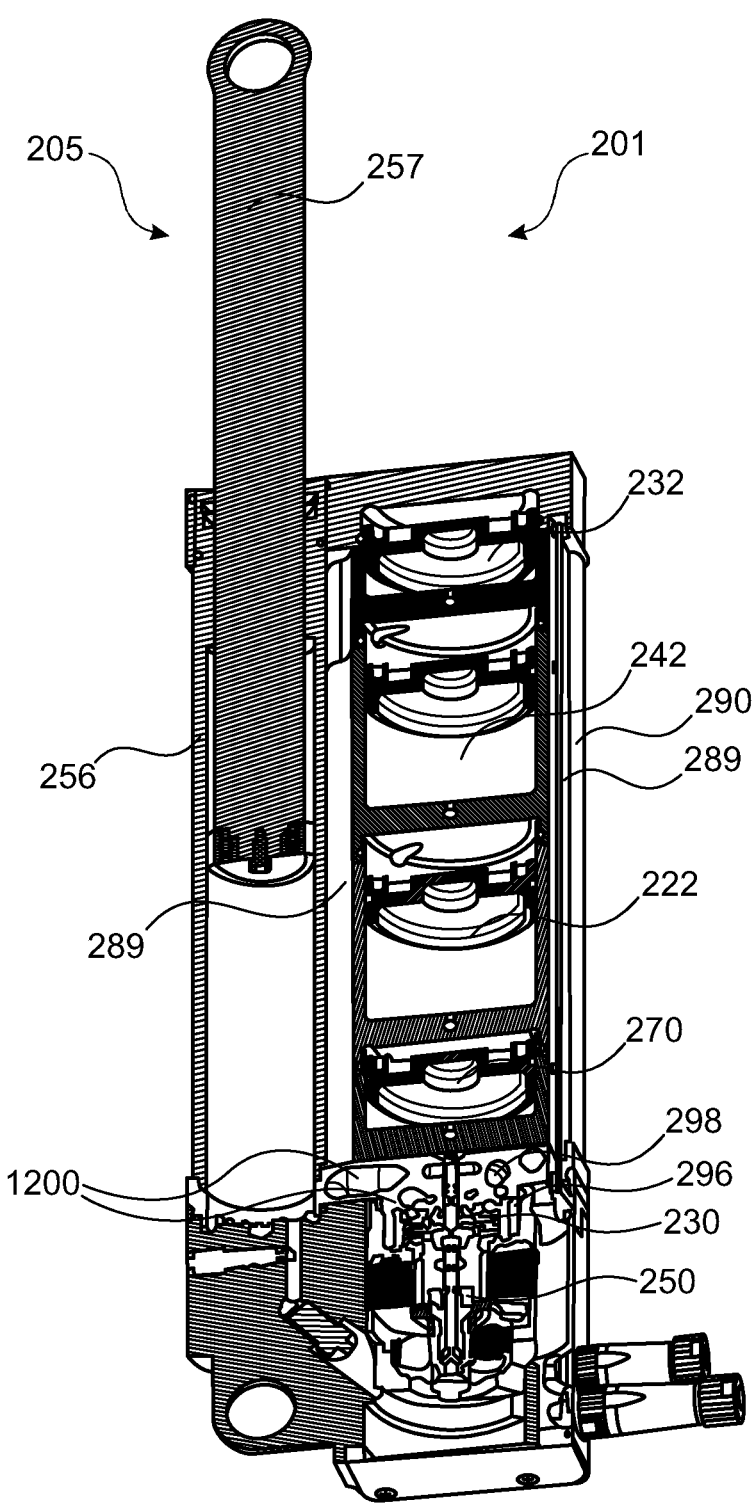
FIG. 13 shows a cross-sectional view of an example active suspension unit incorporating the system of FIG. 1.
Figure 14A:
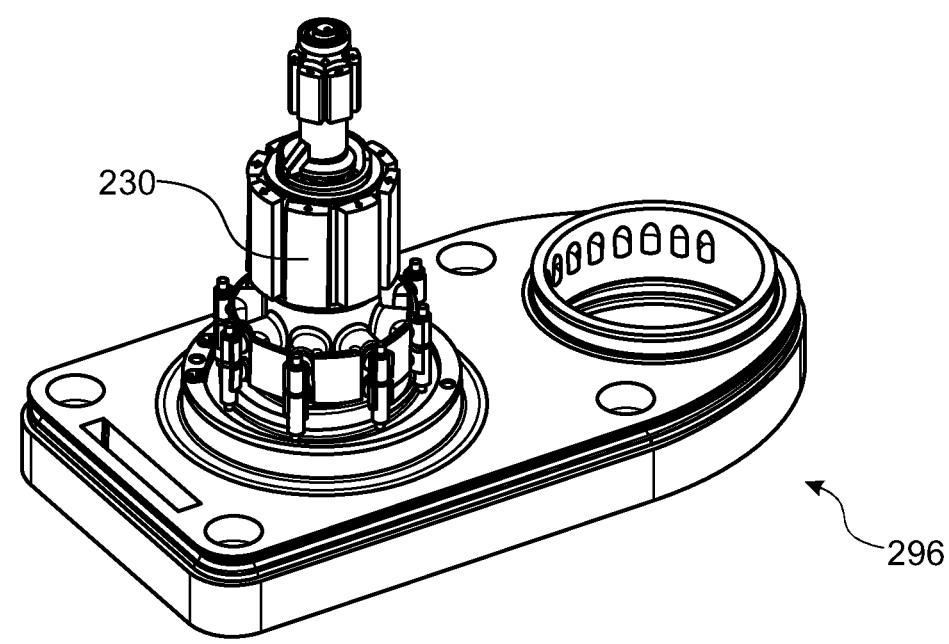
FIG. 14(*a*) shows part of the pump and control unit of the suspension unit of FIG. 13.
Figure 14B:
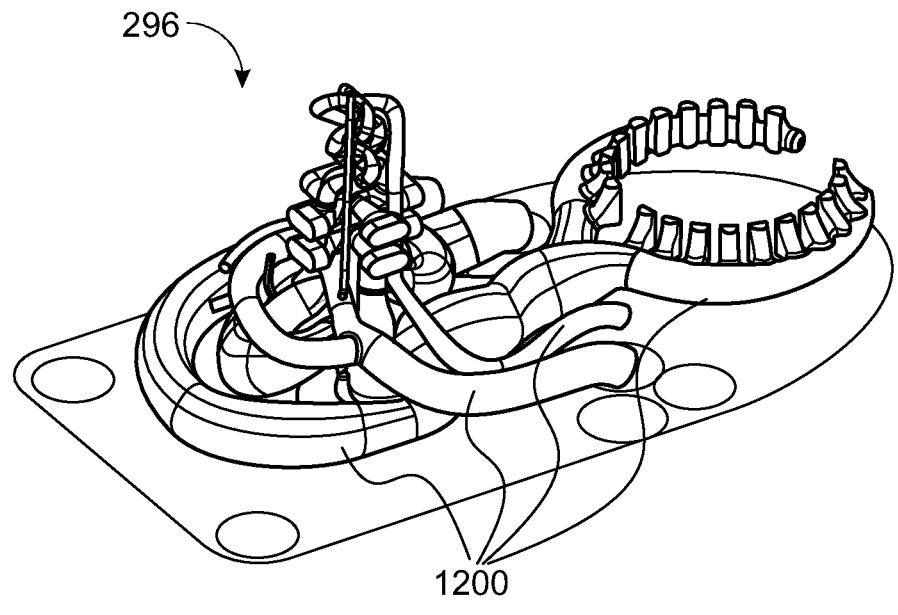
Figure 15:
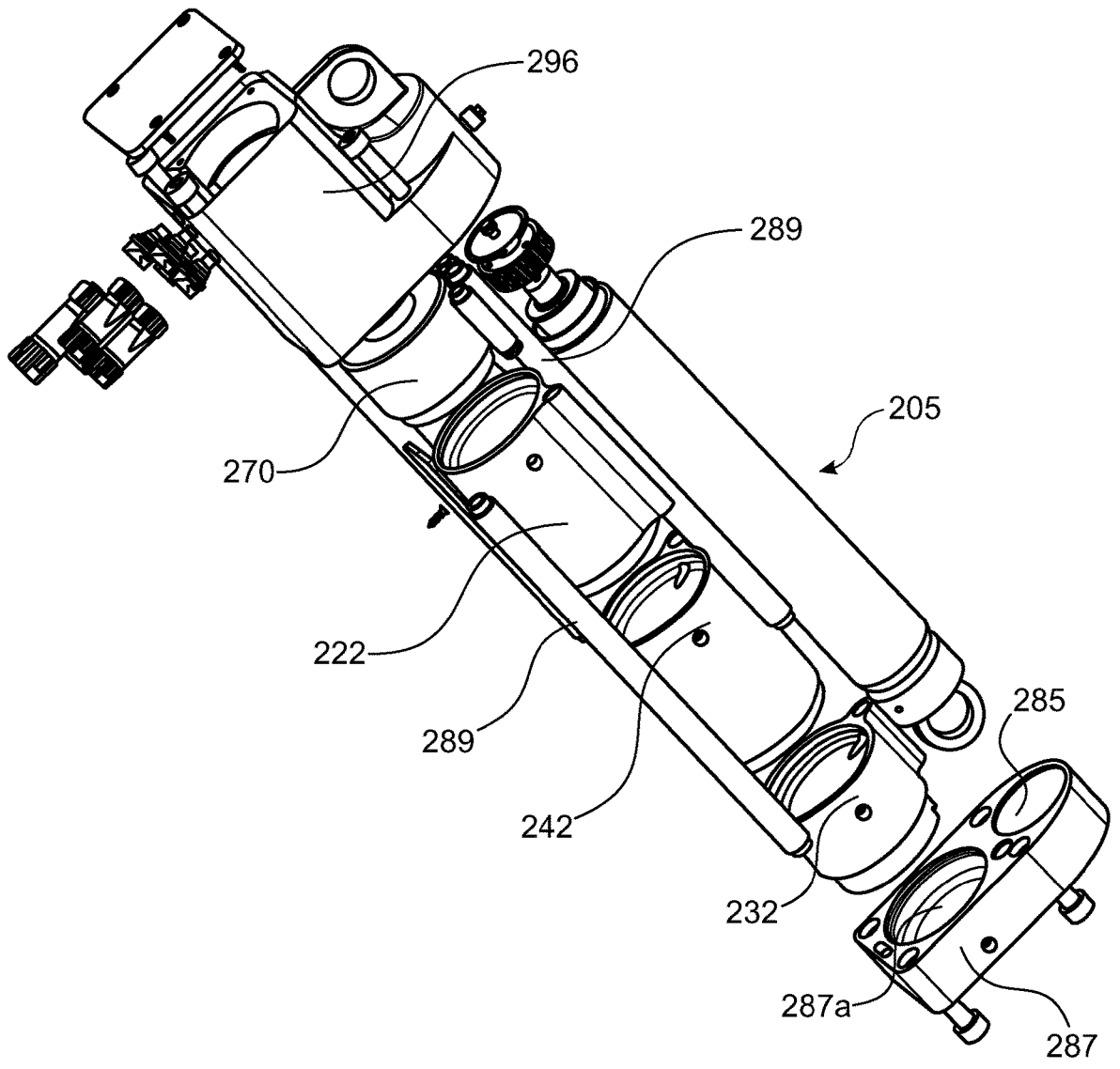
FIG. 15 shows an exploded view of the suspension unit of FIG. 13.

FIG. 13 shows a cross-sectional view of a second example active suspension unit, for example a unit suitable for use as the system of FIG. 1. The hydraulic circuit is contained with the casing 290 of the unit. Only those aspects of the unit of FIG. 13 which differ from the unit of FIG. 10 will be discussed here. The layout of the unit of FIG. 13 is substantially the same of the unit of FIG. 10, with the lower volume accumulator 232, the variable accumulator 242, the higher volume accumulator 222 and the scavenger reservoir 270 arranged in a row to the right of the rod 257. However, in contrast to the unit of FIG. 10 the unit of FIG. 13 has been constructed in a modular fashion. Each of the lower volume accumulator 232, the variable accumulator 242, the higher volume accumulator 222 and the scavenge reservoir 270 are formed as a standalone modular accumulator comprising walls that define the gas and fluid reservoirs and a barrier between them. These modular accumulators are then stacked in a row alongside the sleeve 256 in which the rod 257 is located. An end plate 287 (see FIG. 15) closes off the unit and defines a recess 287a in which the distal end of the lower volume accumulator 232 is located. The end plate 287 includes an aperture 285 through which the rod 257 extends. A pump and control unit 296 is located adjacent the scavenge reservoir 270 at the opposite end of the unit to the end plate 287. The pump and control unit 296 comprises the main valve 250 concentrically located within the pump 230 which is itself located within a pump manifold 298 formed as a single piece using additive manufacturing. FIG. 14a shows the exterior of the pump 230 within the pump and control unit 296. The pump manifold 298 includes a plurality of curvilinear flow galleries 1200 and the internal volume of those galleries is shown in more detail in FIG. 14b. Each of the accumulators 232, 242, 222 and the scavenge reservoir are placed in fluid communication with the pump and control module 296 via one or more rectilinear pipes 289 extending substantially parallel to the longitudinal axis of the rod 257 along the suspension unit and being connected at a proximal end to the curvilinear flow galleries 1200 of the pump and control unit 296. FIG. 15 shows an exploded view of the unit of FIG. 13 in which the modular nature of the accumulators is apparent.

The use of a pump and control unit in combination with modular accumulators may provide an active suspension system that is easier to manufacture. A standard pump and control module can be combined with differently sized modular accumulators in a plug-and-play system to allow a variety of different capacity hydraulic systems to be produced. The use of the standard pump and control module allows the number of parts that must be maintained to be reduced. Further, the use of additive manufacture to produce the complex flow galleries of the pump manifold allows the fluid connections in the rest of the suspension unit to be provided using rectilinear pipes that are straight-forward to manufacture and/or keep as standard stock. Combining additive manufacture with the use of modular parts in this way may also reduce manufacturing costs, as the (relatively expensive) additive manufacturing may be restricted to the pump and control unit and the rest of the suspension unit can be complete by assembling standard components.

While the present disclosure has been described and illustrated with reference to particular embodiments, it will be appreciated by those of ordinary skill in the art that the disclosure lends itself to many different variations not specifically illustrated herein. By way of example only, certain possible variations will now be described.

In the embodiments above the hydraulic actuator 205 is connected at one end (the upper end in FIG. 1) to a car body (see FIG. 2) and at the opposite end to a wheel assembly (see FIG. 2). While the present embodiment has been described in relation to the hydraulic actuator orientated in this way, it should be appreciated that the end shown in present embodiment as being connected to the car body could instead be connected to the wheel assembly, and vice versa.

In the embodiments above the main valve is described as a rotary direct drive valve, but may in some embodiments be a linear direct drive valve. While the present embodiment has been described in relation to the use of a single main valve, it should be appreciated that different types and numbers of valve may be used. For example, a plurality of distinct valves may be used instead of main valve.

In the embodiments above, the system comprises three accumulators arranged for fluid communication with the primary flow path AB, but it will be understood that fewer accumulators may be used instead (e.g. two accumulators) or more accumulators may be used.

In the embodiments above, the system comprises rod with a piston head, but it will be understood that a piston head is not required in some embodiments of the disclosure, where a rod with no piston head may be used instead. This is possible as the system does not require a pressure difference across the piston head (or between the upper and lower chambers of the hydraulic actuator) in order to function.

In the embodiments above, only the large volume accumulator 222 is shown as having a switch valve 223 that has a proportional or variable flow setting, but it will be understood that any switch valve, of any accumulator, may have a proportional or variable flow setting as well, and/or instead.

In the embodiments above a single variable displacement pump having two stages is used, it should be appreciated that two or more fixed displacement pumps may be used, or a variable displacement pump that is not a dual displacement pump may be used as well, and/or instead.

While the embodiments above include a scavenger system, the scavenger system may be absent in other embodiments.

While in the embodiments above the scavenger system is shown as having two seals (281, 282), the scavenger system may only have one seal in other embodiments.

The above embodiments describe an active suspension system, but it will be apparent that the teaching disclosed herein may be equally applicable to a suspension system that is not active in this sense, and that only controls the stiffness and or damping properties of a suspension system.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, while of possible benefit in some embodiments of the disclosure, may not be desirable, and may therefore be absent, in other embodiments.

What is claimed is:

1. A suspension system for an automotive vehicle, the suspension system comprising:
    a hydraulic actuator for mounting between a wheel assembly and a body of the automotive vehicle, and
    a hydraulic system configured to provide a supply of fluid to the hydraulic actuator, wherein the hydraulic system is configured during normal operation to provide fluid at a total pressure greater than 7 MPa (70 Bar) to the hydraulic actuator;
  wherein the hydraulic system comprises:
      a plurality of gas accumulators,
      a common flow path connecting the hydraulic system to the hydraulic actuator,
      and one or more valves;
    wherein each gas accumulator of said plurality of gas accumulators is connected to the common flow path via an associated valve, each associated valve being associated with one or more gas accumulators and independently actuatable to place one or more of said associated gas accumulators in fluid communication with said common flow path, such that, when said associated valve is in an open position corresponding to a selected gas accumulator, pressure changes in said common flow path are transmitted to gas in said selected gas accumulator, wherein the hydraulic system is arranged to be switched between a first configuration in which an associated valve of a first gas accumulator of said plurality of gas accumulators is in an open position and an associated valve of a second gas accumulator of said plurality of gas accumulators is in a closed position, and a second configuration in which the associated valve of the first gas accumulator is in a closed position and/or the associated valve of the second gas accumulator is in an open position; and wherein the hydraulic actuator comprises:

a piston comprising a rod and a piston head mounted on the rod, and a piston housing, wherein:

the piston is mounted for movement within a cavity formed within the piston housing, and a first side and a second side of the piston head divides the cavity into a first chamber and a second chamber, wherein an effective surface area of the first side of the piston head is larger than an effective surface area of the second side of the piston head; and wherein the first chamber is connected to the common flow path via at least one first piston flow path, and the second chamber is connected to the common flow path via at least one second piston flow path, such that a change in pressure in the common flow path is transmitted to both the first chamber and the second chamber.

2. The suspension system according to claim 1, wherein the suspension system is an active suspension system.

3. The suspension system according to claim 1, wherein the suspension system is configured to transmit changes in fluid pressure between the hydraulic actuator, the common flow path, the first gas accumulator and the second gas accumulator such that the hydraulic actuator has a first stiffness when the hydraulic system is in the first configuration and a second, different, stiffness when the hydraulic system in the second configuration.

4. The suspension system according to claim 1, wherein the plurality of gas accumulators comprises a third gas accumulator, and the hydraulic system is arranged to be switched between further configurations by opening or closing the associated valve of the third gas accumulator, and wherein the third gas accumulator is a variable accumulator, and the variable accumulator is connected to a pump of the hydraulic system, and the hydraulic system is configured such that fluid can flow between the pump and the variable accumulator in a first direction, and in a second direction, opposite to the first direction.

5. The suspension system according to claim 1, wherein each of said one or more valves comprises a spool configured to move with respect to a sleeve, wherein a position of the spool relative to the sleeve determines for each of the first gas accumulator and the second gas accumulator whether said first gas accumulator and said second gas accumulator are in fluid communication with the common flow path.

6. The suspension system according to claim 1, wherein a proportional valve is located on a flow path between at least one of the first gas accumulator and the second gas accumulator and the common flow path, and the suspension system is configured such that varying a position of said proportional valve from a first, non-zero, position to a second, non-zero, position varies a damping ratio of the hydraulic actuator.

7. The suspension system as claimed in claim 1, wherein the suspension system comprises at least one variable resistance valve located on either (i) the at least one first piston flow path or (ii) the at least one second piston flow path, wherein, when more than one first piston flow path is present, each first piston flow path comprises a variable resistance valve, and when more than one second piston flow path is present, each second piston flow path comprises a variable resistance valve, such that varying a resistance of a variable resistance value varies a damping rate of the hydraulic actuator.

8. The suspension system according to claim 1, wherein a first portion of the rod is located within the first or second chamber and a second portion of the rod is located outside of the piston housing and the piston housing comprises a sealing region, the sealing region being the region of the housing between said first or second chamber and the exterior of the housing through which the rod extends; at least one seal located in the sealing region and arranged to form a seal between the piston housing and the rod; and at least one scavenge port, said at least one scavenge port being located in the sealing region and between the at least one seal and the first or second piston chamber such that, in use, fluid that enters the sealing region from a piston chamber can exit the sealing region via the at least one scavenge port, the suspension system optionally further comprising a scavenge accumulator connected to the at least one scavenge port and to the common flow path such that fluid can flow from the scavenge port(s) to the common flow path via the scavenge accumulator.

9. The suspension system according to claim 1, wherein the hydraulic system further comprises a pump, the pump being a bidirectional pump that can run both forward and backwards, and the suspension system is configured such that fluid can flow from the pump to the common flow path in (i) a first direction and (ii) in a second direction, the second direction being opposite to the first direction, such that the pump can increase and decrease the pressure in the common flow path.

10. A suspension unit for mounting between a wheel assembly and a body of the automotive vehicle, the suspension unit comprising the suspension system of claim 1, wherein the hydraulic system is contained within a housing of the suspension unit, and at least part of the hydraulic actuator is located partially within the housing of the suspension unit.

11. The suspension unit according to claim 10, wherein a rod is mounted for axial movement within the housing of the suspension unit and extends parallel to a longitudinal axis of the suspension unit, and wherein the hydraulic system comprises the first gas accumulator, the second gas accumulator and a third gas accumulator, wherein the first gas accumulator, the second gas accumulator and the third gas accumulator are arranged in a row along a portion of the length of the suspension unit.

12. An automotive vehicle comprising the suspension system of claim 1 wherein the automotive vehicle comprises a plurality of wheels connected to a chassis and a plurality of suspension systems, one of said plurality of suspension systems being associated with each wheel.

13. A method of controlling a relative movement of a wheel assembly and a body of an automotive vehicle using a suspension system comprising:

a hydraulic actuator connecting the wheel assembly and the body; and a hydraulic system configured to provide a supply of fluid to the hydraulic actuator, wherein the hydraulic system comprises:

a plurality of gas accumulators, a common flow path connecting the hydraulic system to the hydraulic actuator, and one or more valves;

wherein each gas accumulator of said plurality of gas accumulators is connected to the common flow path via an associated valve, each associated valve being associated with one or more gas accumulators and independently actuatable to place one or more of said associated gas accumulators in fluid communication with said common flow path, such that, when said associated valve is in an open position corresponding to a selected gas accumulator, pressure changes in said common flow path are transmitted to gas in the selected gas accumulator, and when said associated valve is in a closed position corresponding to said selected gas accumulator, pressure changes in said common flow path are not transmitted to gas in said selected gas accumulator;

wherein the hydraulic actuator comprises:

a piston comprising a rod and a piston head mounted on the rod, and a piston housing, wherein:

the piston is mounted for movement within a cavity formed within the piston housing, and a first side and a second side of the piston head divides the cavity into a first chamber and a second chamber, wherein an effective surface area of the first side of the piston head is larger than an effective surface area of the second side of the piston head, the first chamber is connected to the common flow path via at least one first piston flow path, and the second chamber is connected to the common flow path via at least one second piston flow path;

wherein controlling the relative movement of the wheel assembly and the body is performed by:

providing fluid via the hydraulic system to the hydraulic actuator via the common flow path at a total pressure equal to or greater than 7 MPa (70 Bar) for a first time period, and during the first time period:

(1) causing one or more changes in the total pressure in the common flow path, and (2) transmitting each of the one or more changes in the total pressure in the common flow path to (i) the first chamber via the at least one first piston flow path and (ii) the second chamber via the at least one second piston flow path; and the method further comprising, during the first time period, changing a stiffness of the hydraulic actuator by actuating the associated valve to switch the hydraulic system between a first configuration in which the associated valve of a first gas accumulator of said plurality of gas accumulators is in an open position and the associated valve of a second gas accumulator of said plurality of gas accumulators is in a closed position, and a second configuration in which the associated valve of the first gas accumulator is in a closed position and/or the associated valve of the second gas accumulator is in an open position.

14. The method according to claim 13, wherein the method comprises, during the first time period, changing a damping rate of the hydraulic actuator by varying a position of a variable resistance valve located on one of (i) the, or each, at least one first piston flow path and (ii) the, or each, at least one second piston flow path.

15. The method according to claim 13, wherein, during the first time period, a pump operates in a first direction to increase a total pressure in the common flow path and the pump operates in a second direction, opposite to the first direction, to decrease the total pressure in the common flow path.

16. The method according to claim 13, wherein the hydraulic system further comprises a pump, and the method comprises, during the first time period, operating the pump in a forward direction such that fluid flows from the pump towards the common flow path and thereby increases the pressure in the common flow path, and operating the pump in a backward direction, such that fluid flows away from the common flow path and into the pump and thereby decreases the pressure in the common flow path.

* * * * *